(12) United States Patent
Asgekar et al.

(10) Patent No.: US 12,488,701 B2
(45) Date of Patent: Dec. 2, 2025

(54) SYSTEMS AND METHODS FOR SEMANTIC CONTENT CUSTOMIZATION

(71) Applicant: Pencil Learning Technologies, Inc., Palo Alto, CA (US)

(72) Inventors: Amogh Asgekar, Palo Alto, CA (US); Ayush Agarwal, San Francisco, CA (US)

(73) Assignee: Pencil Licensing Technologies, Inc., Palo Alto, CA (US)

(*) Notice: Subject to any disclaimer, the term of this patent is extended or adjusted under 35 U.S.C. 154(b) by 596 days.

(21) Appl. No.: 17/984,153

(22) Filed: Nov. 9, 2022

(65) Prior Publication Data
US 2023/0162613 A1 May 25, 2023

Related U.S. Application Data

(60) Provisional application No. 63/278,070, filed on Nov. 10, 2021.

(51) Int. Cl.
*G09B 7/00* (2006.01)
*G06F 16/2457* (2019.01)
*G06F 16/28* (2019.01)

(52) U.S. Cl.
CPC ......... *G09B 7/00* (2013.01); *G06F 16/24575* (2019.01); *G06F 16/288* (2019.01)

(58) Field of Classification Search
CPC ....... G09B 7/00; G09B 5/12; G06F 16/24575; G06F 16/288; G06F 13/322; G06F 16/3344; G06F 16/35
See application file for complete search history.

(56) References Cited

U.S. PATENT DOCUMENTS

| | | | | |
|---|---|---|---|---|
| 12,039,622 | B2* | 7/2024 | Onal | G06Q 50/2057 |
| 2012/0269436 | A1* | 10/2012 | Mensink | G06V 10/764 |
| | | | | 382/180 |
| 2015/0242979 | A1* | 8/2015 | Abts | G06Q 50/2057 |
| | | | | 705/328 |
| 2020/0357296 | A1* | 11/2020 | Sharma | G06Q 50/2057 |
| 2023/0028408 | A1* | 1/2023 | De | H04L 51/02 |
| 2025/0013673 | A1* | 1/2025 | Asgekar | G09B 5/12 |

* cited by examiner

*Primary Examiner* — Omkar A Deodhar
(74) *Attorney, Agent, or Firm* — Pierson Ferdinand LLP; Daniel Rose

(57) ABSTRACT

The present disclosure provides systems and methods for modifying teaching content based on localized cultural and contextual factors. A system can maintain an entity relationship database including semantic triples. The system can identify entities from text content of an information resource. The system can generate, based on the semantic triples, an entity graph including nodes. Each node corresponds to a respective entity identified from the text content. The system can receive an indication to replace a first entity corresponding to a first node with a first replacement entity. The system can determine to replace a second entity corresponding to a second node with a second replacement entity based on the semantic triples and a connection between the first node and the second node. The system can generate processed text content based on the text content, the first replacement entity and the second replacement entity.

20 Claims, 7 Drawing Sheets

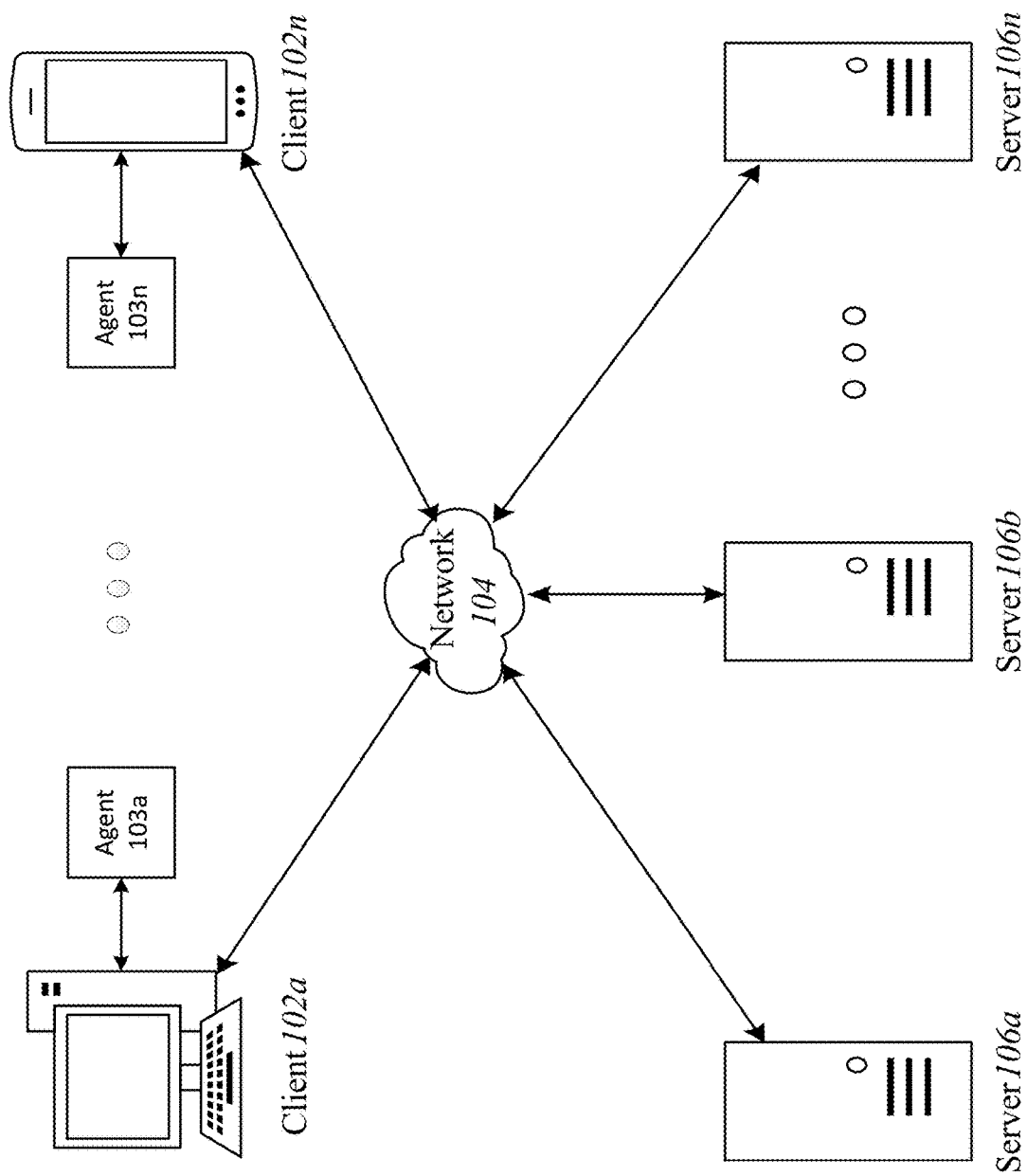

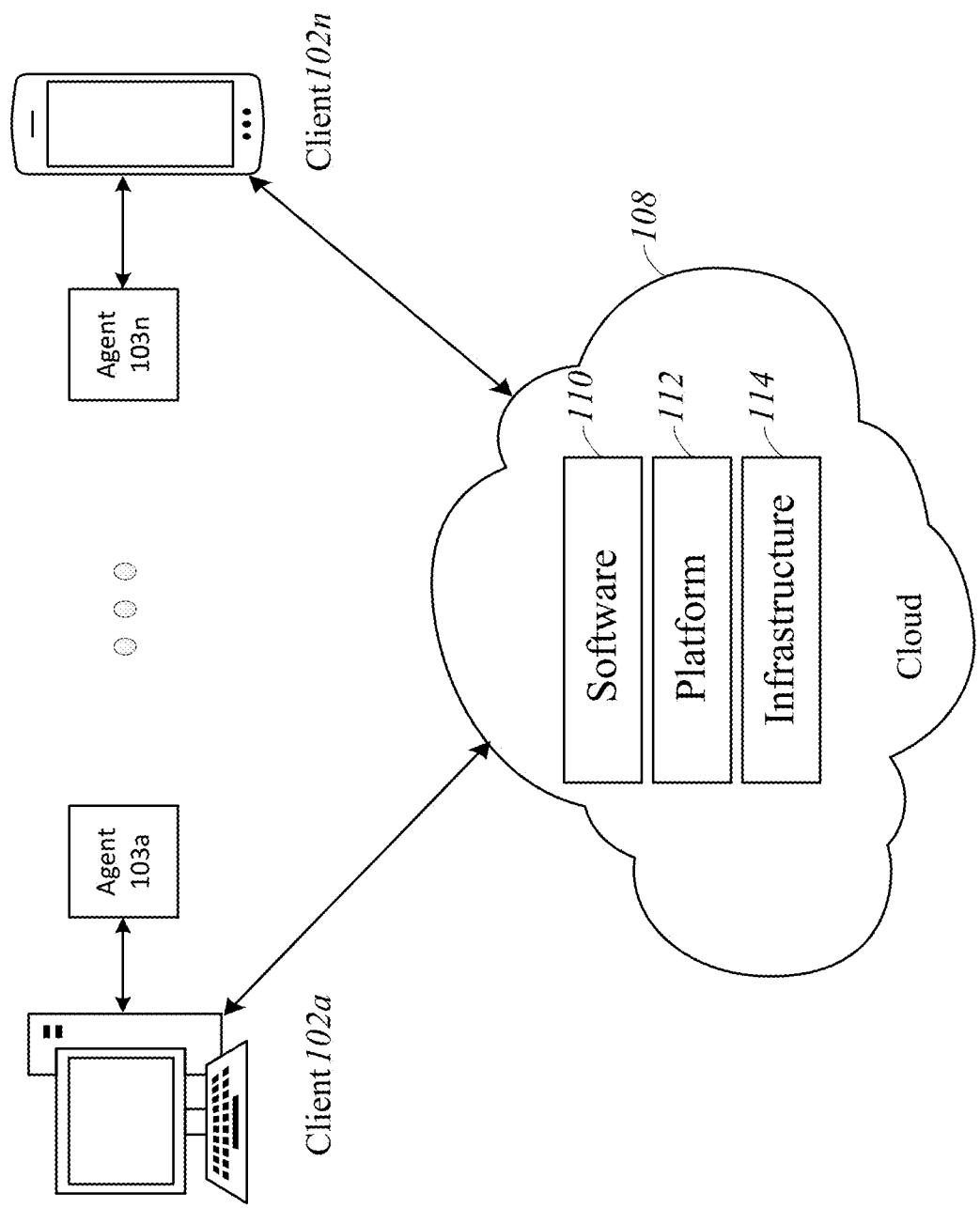

SYSTEMS AND METHODS FOR SEMANTIC CONTENT CUSTOMIZATION

RELATED APPLICATIONS

This application claims the benefit of and priority to U.S. Provisional Patent Application No. 63/278,070, entitled "Systems and Methods for Semantic Content Customization," filed Nov. 10, 2021, the entirety of which is incorporated by reference herein.

BACKGROUND

Educators typically create and format teaching media as part of a lesson plan. It can be challenging to efficiently create media content in multiple different formats that is localized or targeted for various teaching environments and contexts.

SUMMARY

Conventionally, educators manually create and format multiple teaching media that includes the same, or similar, content. This content often includes terms or phrases that help relate teaching subject matter to real-life scenarios that may be experienced by or related to a student. However, certain terms that are relevant to one teaching context, such as a location of a student or class, may be unrelated to or inappropriate for a different teaching context. In general, teachers manually update content (if possible) for a particular learning context, but this can be tedious, produces inconsistent results, and requires in-depth knowledge of different contexts and cultural factors. The systems and methods of this technical solution solve these and other issues by automatically customizing standardized learning materials based on localized cultural and contextual factors.

At least one aspect of the present disclosure is directed to a method of modifying teaching content based on localized cultural and contextual factors. The method can be performed, executed, or otherwise carried out by one or more processors coupled to memory. The method can include maintaining an entity relationship database comprising a plurality of semantic triples. The method can include identifying, using an entity extraction model, a plurality of entities based on text content of an information resource. The method can include generating, based on the plurality of semantic triples in the entity relationship database, an entity graph data structure comprising a plurality of nodes. Each node of the plurality of nodes can correspond to a respective entity of the plurality of entities identified in the text content. The method can include receiving, from a provider device, an indication to replace a first entity corresponding to a first node of the plurality of nodes with a first replacement entity. The method can include determining to replace a second entity corresponding to a second node in the plurality of nodes with a second replacement entity based on the plurality of semantic triples in the entity relationship database and a connection between the first node and the second node in the entity graph data structure. The method can include generating processed text content based on the text content of the information resource, the first replacement entity and the second replacement entity.

In some implementations, identifying the plurality of entities based on the text content in the information resource can include receiving, from the provider device, a selection of the information resource. In some implementations, generating the processed text content can include presenting, on a display of the provider device, the information resource having the text content replaced with the processed text content. In some implementations, maintaining the entity relationship database can include retrieving text information from a content source. In some implementations, maintaining the entity relationship database can include generating the plurality of semantic triples using a semantic processing model and the text information from the content source. In some implementations, receiving the indication to replace the first entity with the first replacement entity can include transmitting, to the provider device, one or more candidate entities to replace the first entity. In some implementations, receiving the indication to replace the first entity with the first replacement entity can include receiving, from the provider device, the first entity as a selection of a candidate entity of the one or more candidate entities.

In some implementations, the method can include receiving an indication of a target location for replacement of the first entity. In some implementations, the method can include generating the one or more candidate entities based on the target location and the plurality of semantic triples. In some implementations, receiving the indication of the target location can include receiving an indication of a target language. In some implementations, receiving the indication of the target location can include determining the target location based on the indication of the target language. In some implementations, the method can include receiving an indication of a user profile comprising one or more profile attributes. In some implementations, the method can include generating the one or more candidate entities based on the one or more profile attributes and the plurality of semantic triples.

In some implementations, the plurality of semantic triples is stored in the entity relationship database as one or more graph data structures. In some implementations, determining to replace the second entity can include performing a graph query over the one or more graph data structures based on the first entity corresponding to the first node. In some implementations, performing the graph query over the one or more graph data structures comprises matching a first edge associated with the first node in the entity graph data structure with a second edge in the one or more graph data structures associated with the first replacement entity. In some implementations, the method can include replacing a first video of the information resource with a replacement video of the information resource based on the indication to replace the first entity and the plurality of semantic triples.

At least one other aspect of the present disclosure is directed to a system for modifying teaching content based on localized cultural and contextual factors. The system can include one or more processors coupled to memory. The system can maintain an entity relationship database comprising a plurality of semantic triples. The system can identify, using an entity extraction model, a plurality of entities based on text content of an information resource. The system can generate, based on the plurality of semantic triples in the entity relationship database, an entity graph data structure comprising a plurality of nodes. Each node of the plurality of nodes can correspond to a respective entity of the plurality of entities identified in the text content. The system can receive, from a provider device, an indication to replace a first entity corresponding to a first node of the plurality of nodes with a first replacement entity. The system can determine to replace a second entity corresponding to a second node in the plurality of nodes with a second replacement entity based on the plurality of semantic triples in the entity relationship database and a connection between the first node and the second node in the entity graph data structure. The system can generate processed text content based on the text content of the information resource, the first replacement entity and the second replacement entity.

In some implementations, the system can identify the plurality of entities based on the text content in the information resource by receiving, from the provider device, a selection of the information resource. In some implementations, the system can generate the processed text content by presenting, on a display of the provider device, the information resource having the text content replaced with the processed text content. In some implementations, the system can maintain the entity relationship database by retrieving text information from a content source. In some implementations, the system can maintain the entity relationship database by generating the plurality of semantic triples using a semantic processing model and the text information from the content source. In some implementations, the system can receive the indication to replace the first entity with the first replacement entity by transmitting, to the provider device, one or more candidate entities to replace the first entity. In some implementations, the system can receive the indication to replace the first entity with the first replacement entity by receiving, from the provider device, the first entity as a selection of a candidate entity of the one or more candidate entities.

In some implementations, the system can receive an indication of a target location for replacement of the first entity. In some implementations, the system can generate the one or more candidate entities based on the target location and the plurality of semantic triples. In some implementations, the system can receive the indication of the target location by receiving an indication of a target language. In some implementations, the system can receive the indication of the target location by determining the target location based on the indication of the target language. In some implementations, the system can receive an indication of a user profile comprising one or more profile attributes. In some implementations, the system can generate the one or more candidate entities based on the one or more profile attributes and the plurality of semantic triples.

In some implementations, the plurality of semantic triples is stored in the entity relationship database as one or more graph data structures. In some implementations, the system can determine to replace the second entity by performing a graph query over the one or more graph data structures based on the first entity corresponding to the first node. In some implementations, the system can perform the graph query over the one or more graph data structures by matching a first edge associated with the first node in the entity graph data structure with a second edge in the one or more graph data structures associated with the first replacement entity. In some implementations, the system can replace a first video of the information resource with a replacement video of the information resource based on the indication to replace the first entity and the plurality of semantic triples.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device;

FIG. 1B is a block diagram depicting a cloud computing environment comprising a client device in communication with cloud service providers;

DETAILED DESCRIPTION

Figure 1C:
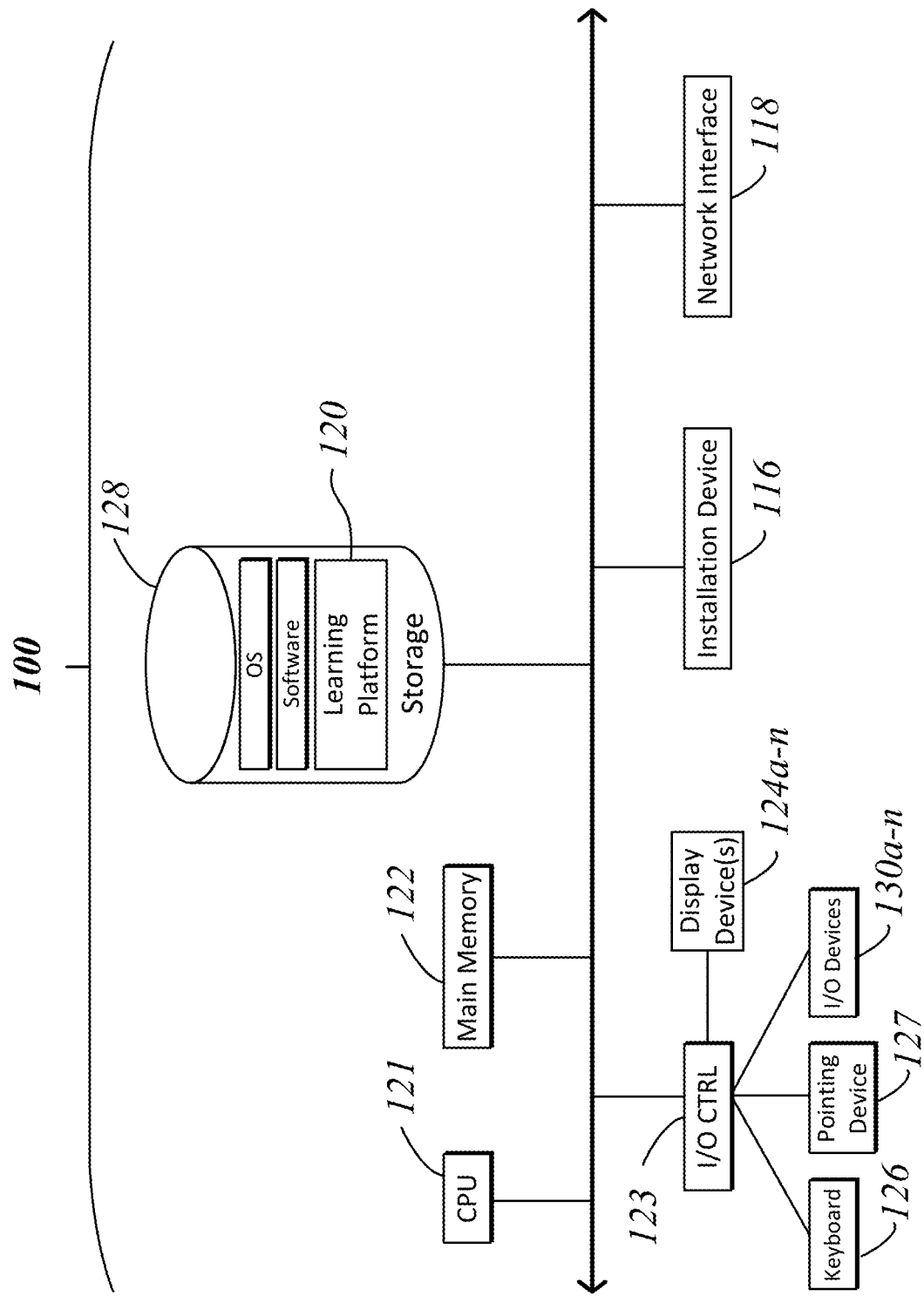
FIGS. 1C and 1D are block diagrams depicting embodiments of computing devices useful in connection with the methods and systems described herein.

Below are detailed descriptions of various concepts related to, and implementations of, techniques, approaches, methods, apparatuses, and systems for modifying teaching content based on localized cultural and contextual factors. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein; and Section B describes systems and methods for modifying teaching content based on cultural and contextual factors.

A. Computing and Network Environment

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, server 106 may be referred to as a remote machine or a node. In another embodiment, a plurality of nodes may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1D:
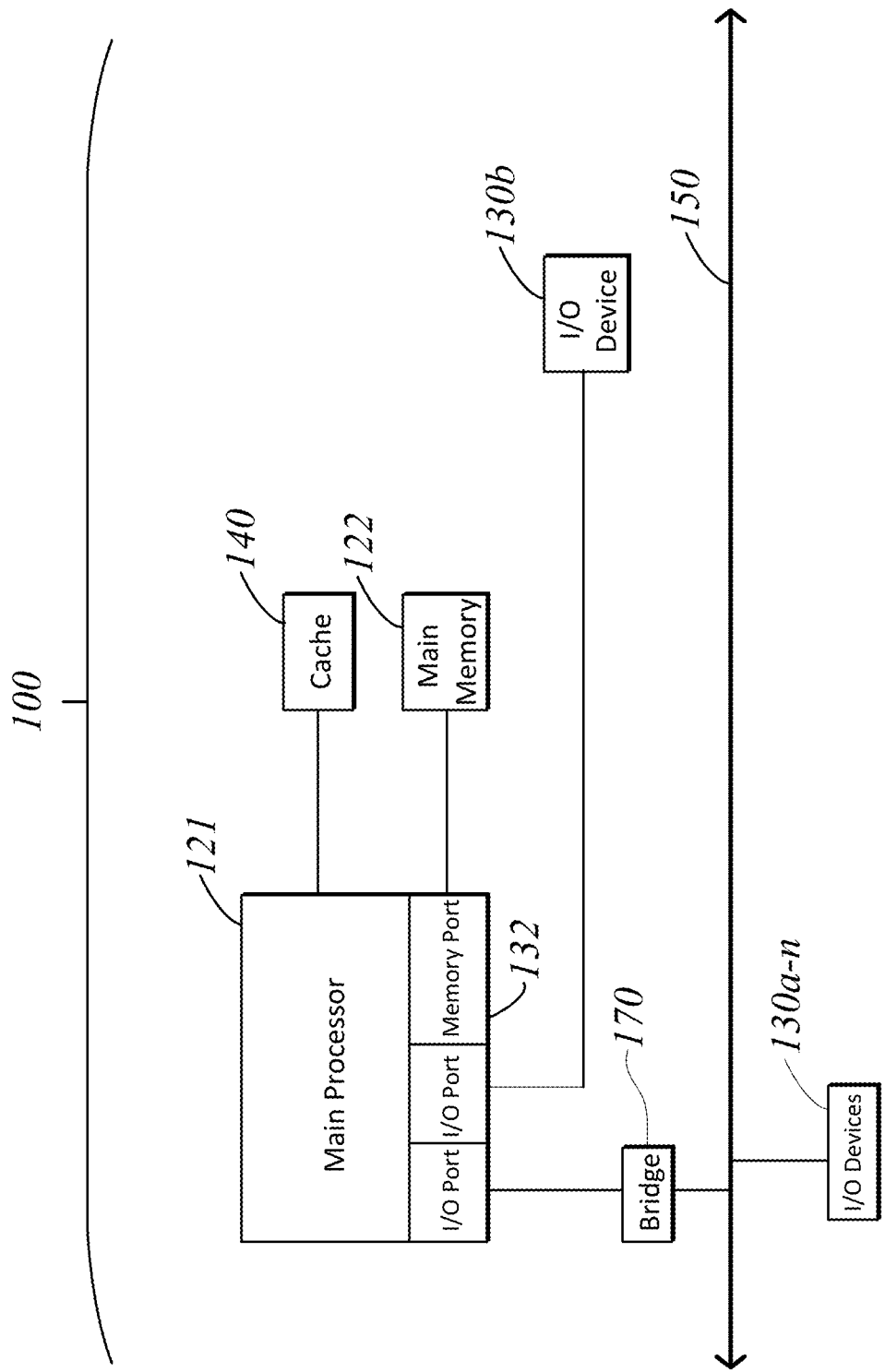

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and learning platform 120, which can implement any of the features of the educational content system 205 described herein below in conjunction with FIG. 2. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WIT, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the learning platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include applications developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, XBOX ONE X, XBOX SERIES S, or an XBOX SERIES X device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Modifying Teaching Content Based on Contextual Factors

As described above, conventionally, educators manually create and format multiple teaching media that includes the same, or similar, content. This content often includes terms or phrases that help relate teaching subject matter to real-life scenarios that may be experienced by or related to students. However, certain terms that are relevant to one teaching context, such as a location of a student or class, may be unrelated to or inappropriate for a different teaching context. In general, teachers manually update content (if possible) for a particular learning context, but this can be tedious, produces inconsistent results, and requires in-depth knowledge of different contexts and cultural factors. The systems and methods of this technical solution solve these and other issues by automatically customizing standardized learning materials based on localized cultural and contextual factors.

While math equations, scientific formulas and the plays of Shakespeare mostly never change, the language and context in which students learn about these concepts often do. The systems and methods of this technical solution can adapt to changing contextual issues by localizing and personalizing teaching content, so that the teaching content is more engaging and relatable to students. To do so, the systems and methods described herein can substitute existing elements in teaching content with contextually appropriate ones.

The systems and methods can substitute, in some implementations, some terms with synonyms of terms in a question, note, or other text based content. For example, an American question may have references to soccer converted to football in for countries outside of the United States.

Further, the systems and methods described herein can substitute conceptually similar references. For example, an American question on projectile motion referencing baseball may be changed to reference another sport such as lacrosse or billiards. The systems and methods described herein can also replace names and other data. For example, a question referencing U.S. states may be changed to reference different countries or cities that relate to a target location or target context. Or, in some implementations, characters in a reading passage may be re-named to share those of students in the class.

The systems and methods described herein can further replace rich content in teaching media, which can include videos, audio, formatted text, or any other type of content. For example, content including a video that is tagged or otherwise associated with a particular context can be replaced with another video covering similar subject matter but that is associated with a different, target context. Additionally, the systems and methods described herein can update teaching content based on user profiles associated with one or more students. User profile information, which can include information about individual interests or experiences, can be used to modify content to be personally engaging to an individual student or group of students. For example, a question on an exothermic reaction can be phrased using baking or internal combustion depending on a user's interest in cooking or cars. To do so, the systems and methods described herein can utilize semantic analysis to determine the subject and intent of content, while identifying malleable elements of nomenclature and example.

The systems and methods of this technical solution can extract relevant pieces of information from teaching content and identify each item in the teaching content having additional attributes. These items of content can then be connected in a graph data structure via relationship defining edges. The system query a database of connected entities to do a structural match, retrieve a group of entities that are identically related to each other, but from a different perspective, and then replace the current entries with the new ones. The entity relationship database is a graphical database consisting of semantic triples represented via predicate subject object relationships. Some examples of predicate subject object relationships are included below:
  carpenter <hammers> nails
  nails <made of> steel
  carpenter <saws> wood
  professor <throws> chalk
  soccer <played on> field
  Similar relationships are adapted for localization:
  Abhishek <name popular in> India
  Mumbai <place in> India The entity relationship database can support typical graphical queries of the type, and find all nodes that match the query. For example, for a query of "Scissors <cut>", the results returned could include "paper", "plastic", or "ribbon", among other results.

To extract entities from content, the systems and methods described herein can extract any text from all structured units of content such as questions, notes, videos (e.g., closed captioning), audio (e.g., following speech recognition), images (e.g., using image or object classification to identify labels for the image, etc.), among others, and append the text content to create a single string. The systems and methods described herein can then utilize a named entity extraction model trained over a relevant corpus (e.g., a context, etc.) to analyze the current string for named entities. The results from the model can be used to generate an ordered list of entities based on a confidence produced by the model for each entity. For example, while both "Newton's second law" and the question "F=ma" might relate to the same entity, each can be output from the entity extraction model with an associated confidence level.

Once the entities have been extracted from the content information, the entity relationship database can be queried to identify relationships between the entities extracted from the content information. Relationships indicated as close (e.g., by a confidence score, etc.), the relationships can be represented as a graph, where each node in the graph represents an entity, and each edge in the graph represents a connection or relationship between two entities. A content provider, such as a teacher or other educational content manager, can provide input to the system that indicates an entity should be changed. In some implementations, the system can provide the teacher or educational content manager with one or more suggested entities for each entity in the content information. The teacher or educational content manager can provide an indication to replace an entity in the content information with a replacement entity. This change can be propagated to other nodes in the graph representing the entities in the content information, and the other entities in the graph can be replaced (if needed) based on the entity relationships in the graph, and the information in the entity relationship database.

For example, consider the following passage.
  John is playing soccer with Jane and is the forward attacker. He kicked the ball to Jane at a 30 degree angle to the goal post while standing on the penalty spot. How far from the left goal post should Jane be standing, such that she can intercept the ball.

The system can accept an input from a teacher or educational content manager to replace the entity "soccer" with another sport, such as "cricket". The entity "soccer" can be replaced with cricket, and the following passage can be generated by modifying the text passage based on the relationships between "soccer" and other related terms in the passage, such as "forward attacker", "kick", "goal post", and "penalty". The modified passage is included below.
  John is playing cricket with Jane and is the batsman. He hit the ball to Jane at a 30 degree angle to the stumps while standing in the crease. How far from the stumps should Jane be standing, such that she can intercept the ball.

Although it has been explained above that the systems and methods described herein can replace text information with other text information based on contextual factors, it should be understood that other forms of content can be replaced or modified in a similar manner. For example, audio content, video content, or image content, among other modalities, can each be replaced with a content to target context factors. Thus, the systems and methods of this technical solution can automatically contextualize content to various localities and cultures. Content consumers, such as students or users that access educational content, can access a wider array of contextually relevant content that corresponds to their local environment. Further, the systems and methods described herein can automatically personalize content to the interests of individual users.

Figure 2:
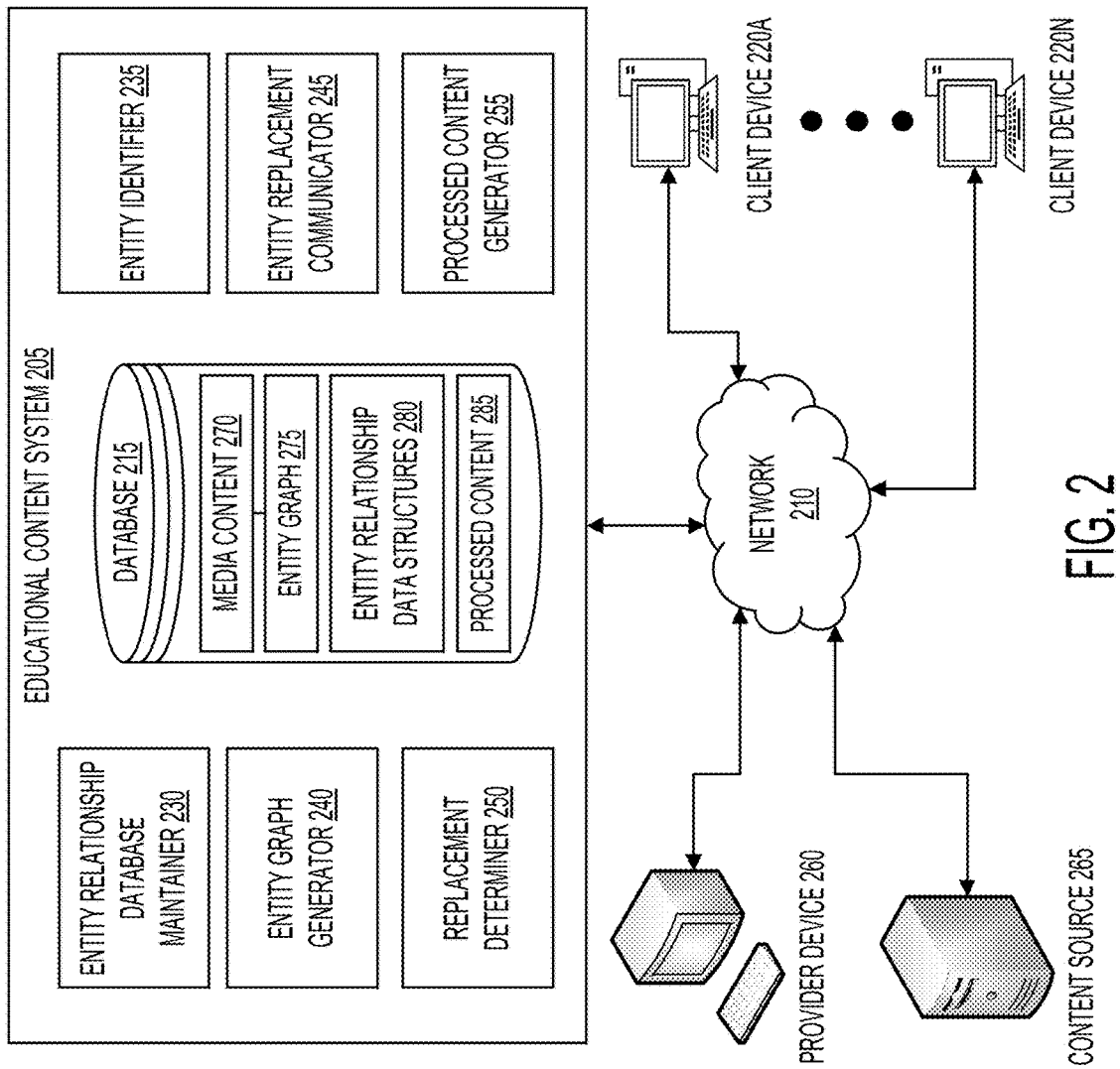
FIG. 2 is a block diagram of an example system for modifying teaching content based on localized cultural and contextual factors, in accordance with one or more implementations.

Referring now to FIG. 2, illustrated is a block diagram of an example system 200 for generating and formatting teaching media in multiple formats for different contexts, in accordance with one or more implementations. The system 200 can include at least one educational content system 205, at least one network 210, one or more client devices 220A-220N (sometimes generally referred to as client device(s)

220), at least one provider device 260, and at least one content source 265. The educational content system 205 can include at least one entity relationship database maintainer 230, at least one entity identifier 235, at least one entity graph generator 240, at least one entity replacement communicator 245, at least one replacement determiner 250, at least one processed content generator 255, and at least one database 215. The database 215 can include media content 270, an entity graph 275, one or more entity relationship data structures 280, and processed content 285. In some implementations, the database 215 can be external to the educational content system 205, for example, as a part of a cloud computing system or an external computing device in communication with the devices (e.g., the educational content system 205, the client devices 220, the provider device 260, the content source 265, etc.) of the system 200 via the network 210.

Each of the components (e.g., the educational content system 205, the network 210, the client devices 220, the provider device 260, the content source 265, the entity relationship database maintainer 230, the entity identifier 235, the entity graph generator 240, the entity replacement communicator 245, the replacement determiner 250, the processed content generator 255, the database 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the educational content system 205 can perform any of the functionalities detailed herein.

The educational content system 205 can include at least one processor and a memory, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The educational content system 205 can include one or more computing devices or servers that can perform various functions as described herein. The educational content system 205 can include any or all of the components and perform any or all of the functions of the computer system 100 described herein in conjunction with FIGS. 1A-1D.

The network 210 can include computer networks such as the Internet, local, wide, metro or other area networks, intranets, satellite networks, other computer networks such as voice or data mobile phone communication networks, or any combinations thereof. The educational content system 205 of the system 200 can communicate via the network 210, for example, with one or more client devices 220, with the provider device 260, or with the content source 265. The network 210 may be any form of computer network that can relay information between the educational content system 205, the one or more client devices 220, the provider device 260, the content source 265, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the educational content system 205, the one or more client devices 220, the provider device 260, the content source 265, the computer system 100, etc.) may communicate wirelessly (e.g., via WiFi, cellular, radio, etc.) with a transceiver that is hardwired (e.g., via a fiber optic cable, a CAT5 cable, etc.) to other computing devices in the network 210. Any or all of the computing devices described herein (e.g., the educational content system 205, the one or more client devices 220, the provider device 260, the content source 265, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

Each client device 220 can include, but is not limited to, a television device, a mobile device, smart phone, personal computer, a laptop, a gaming device, a kiosk, or any other type of computing device. Each client device 220 can be implemented using hardware or a combination of software and hardware. Each client device 220 can include a display device that can provide visual information, such as information presented as a result of executing instructions stored in the memory of the client device 220. The display device can include an liquid-crystal display (LCD) device, an organic light-emitting diode (OLED) display, a light-emitting diode (LED) display, a bi-stable display (e.g., e-ink, etc.), amongst others. The display device can present one or more user interfaces to various regions of the display in accordance with the implementations described herein. In some implementations, the display device can include interactive elements, such as a capacitive or resistive touch sensor. Thus, the display device can be an interactive display (e.g., a touchscreen, a display, etc.), and can include one or more input/output (I/O) devices or interfaces. Each client device 220 can further include or be in communication with (e.g., via a communications bus coupled to the processors of the client devices 220, etc.) one or more input devices, such as a mouse, a keyboard, or digital key pad, among others. The display can be used to present one or more applications as described herein, such as web browsers or native applications. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client devices 220. The interactions can result in interaction data, which can be stored and transmitted by the processing circuitry of the client device 220 to other computing devices, such as those in communication with the client devices 220. The interaction data can include, for example, interaction coordinates, an interaction type (e.g., click, swipe, scroll, tap, etc.), and an indication of an actionable object with which the interaction occurred. Thus, each client device 220 can enable a user to interact with and/or select one or more actionable objects presented as part of graphical user interfaces to carry out various functionalities as described herein.

The client devices 220 can each execute one or more client applications, which can include a web browser or native application that presents educational content provided by the educational content system 205. The one or more client applications can cause the display device of one or more client devices 220 to present a user interface that includes educational content, such as presentation slides, word documents, online questions, or electronic textbooks, among others. The application can be a web application (e.g., provided by the educational content system 205 via the network 210, etc.), a native application, an operating system resource, or some other form of executable instructions. In some implementations, the client application can include a local application (e.g., local to a client device 220), hosted application, Software as a Service (SaaS) application, virtual application, mobile application, and other forms of content. In some implementations, the application can include or correspond to applications provided by remote servers or third party servers. In some implementations, the application can access the information resources 280 maintained by the database 215, and generate a user interface that displays one or more of the information resources 280 on the display device of the client device 220 on which the client application is executing. In some implementations, the user interface can include one or more actionable objects that correspond to multiple choice question answers presented as part of the information resource 280. In some implementations, the actionable object can be a "fill-in-the-blank" box that can accept user input, and transmit the input to the educational content system 205 for storage or further processing. Such actionable objects can include user-selectable hyperlinks, buttons, graphics, videos, images, or other application features that generate a signal that is processed by the application executing on the respective client device 220.

In some implementations, one or more client devices 220 can establish one or more communication sessions with the educational content system 205. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 220 can be computing devices configured to communicate via the network 210 to access the information resources 280, such as web pages via a web browser, or application resources via a native application executing on a client device 220. When accessing the information resources 280, the client device 220 can execute instructions (e.g., embedded in the native applications, or a script in the information resources 280, etc.) that cause the client devices to display educational content, which can include images, video, audio, quiz or exam questions, practice questions, or other types of educational content. As described herein, the client device 220 can transmit one or more requests for educational content to the educational content system 205, and can receive one or more responses that include the requested content. An educational content request can include, for example, a request for a lesson, a request for a question, a request for an information resource related to a topic, or a request for information specified in a query, among others.

In response to interactions with the various user interface elements, the client devices 220 can transmit information, such as account information (e.g., changing account parameters, changing login information, etc.), interaction information, selections of question answers, provided answers to questions, selections of topics, categories, or lesson-based information, or other signals to the educational content system 205. Generally, the client devices 220 can request and display educational content received from the educational content system 205. The requests can include, for example, requests to access information from an educational lesson provided by the provider device 260, or information related to one or more queries provided by the client devices 220. The request can be a hypertext transfer protocol (HTTP or HTTPS) request message, a file transfer protocol message, an email message, a text message, or any other type of message that can be transmitted via the network 210.

The provider device 260 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The provider device 260 can include one or more computing devices or servers that can perform various functions as described herein. The provider device 260 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

The provider device 260 can be substantially similar to one or more of the client devices 220 described herein above, and can include any of the hardware components of the client devices 220, as well as perform any of the functionalities of the client devices 220 as described herein. In addition, the provider device 260 can communicate with the educational content system 205 to provide media content 270, which can be formatted into one or more information resources 280 as described herein. The provider device 260 can be operated by one or more educators or educational content creators, and can provide the media content 270 to the educational content system 205 via the network 210. The media content 270 can also be provided to the educational content system 205 from a content source 265 via the network 210. In some implementations, the provider device 260 can provide the media content 270 to the educational content system 205 in a request to replace an entity (e.g., a portion of text content, an item of content such as an image, video, or audio segment, etc.) in an item of the media content 270. A request to replace an entity can identify an item of media content 270, and can specify an entity in the identified item of media content 270. In some implementations, the request to replace an entity can further identify a replacement entity (e.g., a synonym, a replacement word, a conceptually similar reference, a replacement name, a replacement item of media content such as a replacement image, video, or audio sample, etc.), which the educational content system 205 can use to replace the specified entity. In some implementations, the replacement entity can be transmitted separately, for example, in response to a selection at the provider device 260 of a replacement entity.

In some implementations, the provider device 260 can execute one or more applications, such as a web browser or a native application, which presents a user interface that allows a user (e.g., an educator or an educational content provider, etc.) to transmit media content 270 to the educational content system 205. The user interface can further include features that allow a user to select or otherwise specify an entity in the media content 270 to replace. For example, in some implementations, the provider device 260 can access the media content 270 maintained by the educational content system 205, causing the educational content system 205 to transmit a selected item of media content 270 for display in the user interface of the provider device 260. In the user interface, the provider device 260 can select an entity in the displayed media content 270 for replacement. In some implementations, the provider device 260 can transmit a request for a list of candidate replacement entities to the educational content system 205, which can transmit a response message including the candidate list of replacement entities to the provider device 260 for display (e.g., in the user interface as one or more actionable objects, etc.). A user of the provider device 260 can make a selection from the list of candidate replacement entities, causing the provider device 260 to transmit a message to the educational content system specifying the replacement entity and the entity in the item of media content 270 that is subject to the replacement request.

In some implementations, the entity replacement request can include a selection of one or more items of the media content 270 maintained by the educational content system 205, such that the request specifies that the specified entity should be replaced in the one or more selected items of the media content 270. To select an item of media content 270, the provider device 260 can transmit one or more queries to the educational content system 205 that can request media content 270 related to a topic, category, or set of keywords provided in the one or more queries. The educational content system 205 can transmit a list of the media content 270 relating to the queries to the provider device 260, from which the provider device 260 can make selections regarding the replacement of entities therein by transmitting entity replacement requests. For example, the entity replacement request can specify one or more items of media content 270, one or more entities in the items of media content 270 to replace (e.g., a portion of text content, an image, video, or audio content, etc.), and can specify one or more respective entities that are to replace the one or more specified entities.

The user interfaces presented on the display device of the provider device 260 can provide a user with access to each of the media content 270, and the entity graph 275 (described in detail herein), and the processed content 285. In some implementations, the provider device 260 can access only the media content 270, the entity graph 275, and the processed content 285, which the provider device 260 is authorized to access. For example, the provider device 260 can access the functionality of the educational content system 205 by first entering login credentials or other identification information that identifies an account of the provider device 260 that is maintained by the educational content system 205. The account can be associated with certain media content 270, entity graphs 275, and processed content 285, and which can then be accessed (e.g., requested, displayed, modified, transmitted, deleted, created, etc.) by the provider device 260 in response to the authentication credentials.

The content source 265 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The content source 265 can include one or more computing devices or servers that can perform various functions as described herein. The content source 265 can include any or all of the components and perform any or all of the functions of the computer system 100 described herein in conjunction with FIGS. 1A-1D.

The content source 265 can include one or more servers, such as servers of a cloud computing system, that maintain any sort of semantically related content. For example, the content source 265 can be a web-hosted encyclopedia that includes one or more articles, each having semantically related text content. The content source 265 can transmit any text content hosted by the content source 265 to the educational content system 205 via the network 210, for example, in response to one or more requests for content. The content provided by the content source 265 can include content items for display on information resources, such as images or videos. In some implementations, the content source 265 can include textual content that describes the third-party content items (e.g. images, video, audio, etc.), thereby associating said content items with text content. The content source 265 can provide or be the source of content (e.g., text content, image content, video content, audio content, etc.) for display or presentation in one or more information resources, which can be accessed directly by the one or more client devices 220, the one or more provider devices 260, or the educational content system 205 (e.g., in response to one or more requests for content, etc.). The content provided by the content source 265 can be displayed on information resources other than web pages, such as content displayed as part of the execution of an application on a smartphone or other client device. The content source 265 can store large amounts of content that can be indexed by one or more values, categories, topics, or other semantically related information. In some implementations, the content source 265 can contain large amounts of content in response to one or more batch requests received from the educational content system 205.

The database 215 can be a computer-readable memory that can store or maintain any of the information described herein. The database 215 can maintain one or more data structures, which may contain, index, or otherwise store each of the values, pluralities, sets, variables, vectors, numbers, or thresholds described herein. The database 215 can be accessed using one or more memory addresses, index values, or identifiers of any item, structure, or region maintained in the database 215. The database 215 can be accessed by the components of the educational content system 205, or any other computing device described herein, such as the client devices 220 or the provider device 260, via the network 210. In some implementations, the database 215 can be internal to the educational content system 205. In some implementations, the database 215 can exist external to the educational content system 205, and may be accessed via the network 210. The database 215 can be distributed across many different computer systems or storage elements, and may be accessed via the network 210 or a suitable computer bus interface. The educational content system 205 (or the components thereof) can store, in one or more regions of the memory of the educational content system 205, or in the database 215, the results of any or all computations, determinations, selections, identifications, generations, constructions, or calculations in one or more data structures indexed or identified with appropriate values. Any or all values stored in the database 215 may be accessed by any computing device described herein, such as the educational content system 205, to perform any of the functionalities or functions described herein. In some implementations, the database 215 can be similar to or include the storage 128 described herein above in conjunction with FIG. 1C. In some implementations, instead of being internal to the educational content system 205, the database 215 can be a distributed storage medium in a cloud computing system, such as the cloud 108 detailed herein in connection with FIG. 1B.

The database 215 can store media content 270, which can be provided by the provider device 260 as described herein. In some implementations, the media content 270 can be stored in association with an identifier (e.g., an authentication credential, a username, etc.) of the user that provided the media content 270. The media content 270 can include any form of educational media, such as text, images, video, audio, or instructions to display images, video, or text in an information resource. The media content 270 can be stored in association with one or more tags, topics, or category identifiers that indicate the type of information provided by the media content 270. The media content 270 can be stored as individual content items in one or more data structures, and can be stored in association with a timestamp corresponding to the time the item of media content 270 was stored in the database 215. The media content 270 can have various presentation attributes. For example, images can include presentation attributes such as image height, image width, image format (e.g., BMP, PNG, JPEG, SVG, etc.), image bit-depth, and other image attributes. Presentation attributes for videos can include video duration, video codec, sound codec, and video resolution (e.g., width, height, etc.), closed captioning information (e.g., text content, etc.), among others. Presentation attributes for text can include font type-face, font size, text location, text formatting information, and other information. In some implementations, an item of media content 270 can include an identifier to a different item of media content 270. For example, an item of media content 270 can include instructions that cause the item of media content 270 to be presented on an information resource with a second item of media content 270. In some implementations, the presentation attributes of the item of media content 270 can specify a relative position of the item of content to the second item of media content 270 when presented on an information resource.

The database 215 can store or maintain one or more entity graphs 275, for example, in one or more data structures. Each of the entity graphs 275 can be associated with one or more items of media content 270. The entity graphs 275 can be generated based on one or more entities in the media content. An entity can include any displayable portion of the media content 270 can affect the semantic meaning of the media content 270. For example, an entity can include a portion of text (e.g., one or more sequential words, etc.), an image, a video, or an audio segment, among others. Each entity can represent a node in an entity graph 275. In some implementations, each entity in an item of media content 270 can form its own entity graph 275 that represents the relationships between the entity in the item of media content 270 to the other entities in the item of media content 270. The entity in the item of media content 270 can represent a root node in its respective entity graph 275, which edges that connect to each other entity in the item of media content 270. A depiction of such an entity graph 275 shown in FIG. 3. An entity graph 275 can be generated by the educational content system 205 (e.g., as described in greater detail herein) for each entity in an item of media content 270, such that each entity can form its own root node for its respective entity graph 275.

The edges of each entity graph 275 can form connections with other entities in an item of media content 270. The edges can thus from predicate-subject-object semantic triples, an example of which is included shown below:

carpenter <hammers> nails
carpenter <saws> wood where each row corresponds to a semantic triple, which itself represents a node connected to another node via an edge in the entity graph. As shown above, the root node for the entity graph 275 for the entity "carpenter" can include two edges that connect it to two other nodes in an item of media content 270. Although only two entity relationships are shown above, it should be understood that the number of relationships connecting an entity to other entities in an item of media content 270 can vary based on the number of or semantic nature of the media content 270. The entity graphs 275 can be generated by the educational content system 205 (or the components thereof) as described in greater detail below. The semantic relationships defined by the edges in an entity graph can be used to replace a root entity, and the entities semantically related to the root entity, with a replacement entity based on the relationships defined in the entity relationship data structures 280, as described herein below.

The database 215 can store or maintain one or more entity relationship data structures 280, which can include one or more data structures defining semantic triples represented via predicate subject object relationships. The entity relationship data structures 280 can be stored or maintained as a graph data structure, similar to the entity graphs 275. The entity relationship data structures 280 can store relationships for many entities that may form a part of the media content 270. Said another way, the media content 270 includes one or more fixed entities, from which the entity graphs 275 can be generated. The entity relationship data structures 280 include the semantic relationships between all entities that could appear in the media content 270 in one or more large graph data structures, where each node in the entity relationship data structures 280 corresponds to an entity. As described above with respect to the entity graphs 275, each edge connecting two entities can represent a semantic relationship between two entities.

However, each entity in the entity relationship data structures 280 need not necessarily be root nodes, and instead can form a large interconnected graph between many different entities extracted from content hosted by the content source 265. In The entity relationship data structures 280 can be generated based on data retrieved from, for example, the content sources 265. The content sources 265 can store text content or other semantic content that can be processed by the educational content system 205 to generate the entity relationship data structures 280. The entity relationship data structures 280 can be stored such that the educational content system 205 can perform one or more graph queries on the entity relationship data structures 280 to access nodes connected to potential replacement entities that have similar semantic structure. Thus, the entity relationship data structures 280 can be used by the educational content system 205, as described herein, to generate the entity graphs 275 and to replace one or more entities in the media content 270. In some implementations, the entity relationship data structures 280 can include many graph data structures that each represent a semantic relationship graph between entities in different languages. Said another way, the entity relationship data structures 280 can include a graph data structure as described above for each language, which represents the semantic relationships between each word (e.g., entity, etc.) in that language.

The database 215 can store or maintain one or more items of processed content 285, for example, as stored in one or more data structures. The processed content 285 can be one or more items of media content 270 that have been processed (e.g., replaced with one or more replacement entities, etc.), as described herein. In some implementations, the processed content 285 can be information resources that present specified media content 270 (e.g., specified by instructions in the processed content, etc.), according to appropriate formatting rules. Said another way, in some implementations, each item of processed content can specify one or more items of media content 270 (e.g., with one or more entities replaced, etc.) to display according to the presentation attributes of the media content 270. As described herein, the processed content 285 can include any sort of presentable content, including web pages, online quizzes, online exams, practice textbooks, native application pages, word processing documents, packaged document format (PDF) documents, presentation slides, or flashcards, among others. The processed content 285 can be accessed by one or more provider devices 260, or one or more client devices 220. The provider device 260 can access and modify the processed content 285, the media content 270, and the entity graphs 275 via a user interface presented on the provider device 260. Each of the components of the educational content system 205 can access, update, or modify the media content 270, the entity graphs 275, the entity relationship data structures 280, or the processed content 285, to carry out functionalities detailed herein.

Referring now to the operations of the educational content system 205, the entity relationship database maintainer 230 can 11 maintain the entity relationship data structures 280 in the database 215. The entity relationship data structures 280 can include one or more semantic triples, which can form one or more graph data structures. As described herein above, the entity relationship data structures 280 can be created from the semantic relationships between entities extracted from large amounts of text content, such as the text content maintained by one or more of the content sources 265. In some implementations, the entity relationship database maintainer 230 can retrieve text information from the content sources 265. For example, the entity relationship database maintainer 230 can transmit one or more requests for content to the content source 265. The requests for content can be scraping requests, or requests for some (e.g., a predetermined or specified number, etc.) or all content under a particular subdomain, related to a particular category, related to a particular topic, or related to a particular keyword. In response, the content source 265 can transmit the content requested by the entity relationship database maintainer 230, for example, in one or more response messages. In some implementations, the requests for content transmitted to the content source 265 can be batch content requests, and the content source response messages can transmit batch response messages including many portions or items of content (e.g., one or more information resources such as web pages, text articles, etc.). The entity relationship database maintainer 230 can transmit such content requests to one or more content sources 265 via the network, and thus retrieve content from a variety of content sources 265. For example, in some implementations, each content source 265 can correspond to content of a particular language. In such implementations, the entity relationship database maintainer 230 can retrieve content from the content sources 265 corresponding to each language, and proceed with further processing as described herein.

In some implementations, for content that may not include text content (e.g., images, video, etc.), the entity relationship database maintainer 230 can assign text content to the content. For example, the entity relationship database maintainer 230 can perform object recognition and classification on an image to identify, classify, and label image content. The image can be labeled with one or more categories, objects, subjects, or other information that can be classified from the image. Likewise, similar processes can be performed on video content (e.g., image or object classification, text extraction from closed-captioning information, etc.) and from audio content (e.g., speech-to-text recognition to generate text corresponding to the audio, etc.).

This information can be stored in association with the non-text content received from the content sources 265.

Using the content retrieved from the one or more content sources 265, the entity relationship database maintainer 230 can generate semantic triples using a semantic processing model. For example, the entity relationship database maintainer 230 can provide text content, or text content inferred or determined from other content formats, into the semantic processing model. The semantic processing model can be, for example, a named entity recognition (sometimes referred to as a named entity identification model or an entity extraction model) that can extract one or more named entities from the text content retrieved from the content sources 265. The named entity recognition model can identify and classify named entities in the text content retrieved from the content sources 265 into predefined categories such as person names, organizations, actions, objects, locations, or time periods, among others. Thus, the semantic processing model can take the text content as input, and output a set of annotations for the text content that identify predicate subject object relationships. The semantic processing model can operate, for example, using machine learning (e.g., natural language processing techniques, etc.) or using tuned or trained rule-based techniques. For example, the semantic processing model can include a natural language processing model that can receive a sentence, or phrase, as input, and output annotations corresponding to the relationships between the entities in the sentence or phrase. In some implementations, a look-up table can be used to extract some well-known proper nouns as entities (e.g., well known locations, famous people, culturally relevant names, etc.).

The entity relationship database maintainer 230 can use the relationships output from the semantic processing model to generate and store the entity relationship data structures 280 in the database 215. For example, for each predicate subject object semantic triple, the entity relationship database maintainer 230 can create a node corresponding to the subject of the semantic triple and create a node corresponding to the object of the semantic triple. The edge connecting the two nodes can be generated in the entity relationship data structures 280 using the predicate. As described above, this relationship can be stored in a graph format as part of the entity relationship data structures 280. If the node corresponding to the subject already exists in the graph, but the edge or the node corresponding to the object do not, the entity relationship database maintainer 230 can create the missing edge or node, and thus build up the graph in the entity relationship data structures 280. The entity relationship database maintainer 230 can repeat this process, and construct a robust graph with many nodes and edges indicating many relationships, for all of the text content retrieved from the content sources 265. If a particular portion of text content used to generate a node was extracted from or is associated with (e.g., an indication of association received from the content sources 265, etc.) an image, video, or other non-text content, the node can be generated with an association to an identifier of the image (e.g., a uniform resource identifier, an identifier of media content 270 including the non-text content, etc.). In some implementations, the entity relationship database maintainer 230 can receive indications of new or updated content from a content source 265, which causes the entity relationship database maintainer 230 to transmit a request for the new or updated content to the respective content source 265. The entity relationship database maintainer 230 can receive the new or updated content, and update the entity relationship data structures 280 as described herein.

To construct the entity graphs 275 from the media content 270, the entity identifier 235 can first identify, using an entity extraction model, one or more entities based on text content of an item of media content 270 or an information resource. To do so, the entity identifier 235 can extract the text content from a specified item of media content 270. In some implementations, the entity identifier 235 can construct a single text string from all of the text content in a particular item of media content 270 (or an information resource, etc.). In some implementations, the entity identifier 235 can receive a selection of the information resource or the item of media content 270, from a provider device 260. As described above, the provider device 260 can make a selection of one or more items of media content 270 using a user interface displayed at the provider device 260. The provider device 260 can make the selection, for example, in a request to replace a particular entity in the item of media content, or if an entity graph has not yet been created for the item of media content 270, in a request to enumerate the entities in the media content 270 that can be replaced.

Upon identifying the specified item of media content 270 can extract all text content from the item of media content 270, the text content can then be input to the entity extraction model, which can output one or more entities or entity relationships (e.g., entity annotations, etc.). In effect, the entity identifier 235 can identify each of the entities in an item of media content that can be replaced. In some implementations, the entity identifier 235 can generate an initial entity graph 275 for each identified entity by generating the initial entity graph to include the identified entity as a root node. In some implementations, the entity identifier 235 can transmit the identified entities extracted from the text content. For example, the entity identifier 235 can transmit the media content 270 with annotations for each of the identified entities in a response message. The response message can include instructions that cause the provider device 260 to transmit a request to replace a selected entity in the media content in response to a selection (e.g., an interaction, etc.) with an identified entity in the media content 270. In some implementations, if an output from the entity extraction model is ambiguous, the entity identifier 235 can execute a disambiguation model on the ambiguous entity to identify similar entities (e.g., using semantic processing, etc.) that are stored in the entity relationship data structures 280. From the similar entities, the entity identifier 235 can identify a specific entity label for the ambiguous text content in the media content 270, and use the specific entity label in further processing.

Once the entities have been identified in the text content, the entity graph generator 240 can generate an entity graph 275 for one or more of the identified entities. For example, in some implementations, the entity graph generator 240 can receive an indication to replace a particular entity in the text content from a provider device 260. In some implementations, the entity graph generator 240 can generate an entity graph 275 for each entity identified in the text content. To do so, the entity graph generator 240 can utilize the output from the entity extraction model to identify entities that form close relationships. For example, as described herein above, the entity extraction model can annotate text content with an identification of predicate subject object triples. From these triples, the entity graph 275 can generate a graph data structure for each identified entity, with each identified entity forming a root node of the graph data structure. The edges in the graph data structure can indicate a relationship between the root node entity and all of the other entities identified in the text content. If a relationship cannot be inferred between the root node entity and another entity from the text content (e.g., not enough information, etc.), the entity graph generator 240 can access the entity relationship data structures 280 to determine a type of relationship. For example, the entity graph generator 240 can search the entity relationship data structures 280 to identify an edge that connects a node corresponding to the root node entity and a second node corresponding to the second node with which a relationship could not be identified. The entity graph generator 240 can extract the edge connecting the corresponding nodes in the entity relationship data structures 280, and use the edge to define the relationship between the nodes with the unknown relationship in the entity graph 275. Thus, the entity graph generator 240 can utilize the entity relationship data structures 280 to generate one or more entity graphs 275 for each of the identified entities in the text content of the media content 270. The entity graph generator 240 can store the entity graphs in association with the corresponding item of media content 270. In some implementations, the entity graph generator 240 can store an entity graph 275 in association with the respective portions of the text information that correspond to the root node of the entity graph 275.

The entity replacement communicator 245 can receive, from a provider device 260, an indication to replace an entity in media content with a replacement entity. For example, as described above, an item of media content 270 can be displayed on the provider device 260 with the one or more identified entities from the text of the media content 270 in one or more user interfaces. In the user interface, the provider device 260 can select an entity in the displayed media content 270 for replacement. In some implementations, the provider device 260 can transmit a request for a list of candidate replacement entities to the educational content system 205. In some implementations, the provider device 260 can transmit a request for a target location to the entity replacement communicator 245 as part of the request for the list of candidate replacement entities. In some implementations, the provider device 260 can transmit a request for a target language to the entity replacement communicator 245 as part of the request for the list of candidate replacement entities. In such implementations, the entity replacement communicator 245 can use a lookup table to determine a target location based on the indication of the target language.

In some implementations, the provider device 260 can transmit an indication of a user profile in the request for the list of candidate replacement entities. The entity replacement communicator 245 can receive the indication of the user profile. The profiles can correspond to one or more students or users that access the media content 270 and the processed content 285 via the educational content system 205. Each of the profiles can be associated with a profile identifier that identifies the profile. In general, the profiles can be accessed via one or more of the client devices 220 or the provider device 260 using particular authentication credentials. For example, each profile can be accessed using a particular set of authentication credentials. A profile can include information about a user, and can be accessed and modified via one or more of the client devices 220 or the provider device 260. In some implementations, a profile can be stored in association with a list of courses or lesson plans that can be defined by an educator using a provider device 260 or a client device 220. The profile can include one or more profile attributes, which can indicate user interests, preferences, location, or other information.

Using these profile attributes and the indication of the entity to be replaced, the entity replacement communicator 245 can access the entity relationship data structures 280 to generate the candidate entities. For example, given a particular entity that corresponds to a particular category (e.g., sports, cars, etc.), the entity replacement communicator 245 can identify one or more profile attributes that correspond to that category. For example, the profile attributes can indicate that a user is interested in baseball. Using this information, the entity replacement communicator 245 can access the entity relationship data structures 280 to identify candidate replacement entities that are related to the category (e.g., sports, cars, etc.) and to one or more of the interests indicated in the profile attributes. Likewise, if the entity to be replaced is a name or a location, the entity replacement communicator 245 can access the entity relationship data structures 280 to identify one or more candidate replacement entities that relate to locations proximate to the location indicated in the user profile, or names common to the location indicated in the user profile attributes.

Thus, the entity replacement communicator 245 can query the entity relationship data structures 280 to identify one or more candidate replacement entities. For example, the candidate replacement entities can include entities that are semantically related to the selected entity. In some implementations, the entity replacement communicator 245 can identify one or more synonyms of the selected entity (e.g., or a similar phrase with a similar meaning, etc.). In some implementations, if the selected entity is a name (e.g., a name of a person, a name of a location, etc.), the entity replacement communicator 245 can identify one or more candidate replacement entities for the selected entity that correspond to a target location. The entity replacement communicator 245 can transmit a response message including the candidate list of replacement entities to the provider device 260 for display (e.g., in the user interface as one or more actionable objects, etc.). A user of the provider device 260 can make a selection from the list of candidate replacement entities, causing the provider device 260 to transmit a message to the entity replacement communicator 245 specifying the replacement entity and the entity in the item of media content 270 that is subject to the replacement request.

In addition to replacing the specified entity in the media content, the replacement determiner 250 can replace other entities in the media content 270 that are semantically related to the replacement entity. To do so, the replacement determiner 250 can determine to replace a second entity corresponding to a second node in the entity graph 275 that is connected to the root node (e.g., the first entity being replaced) in the entity graph 275. The replacement determiner 250 can replace one or more of the other entities (e.g., entities corresponding to nodes in the entity graph that are connected to the root node, etc.) by querying the entity relationship data structures 280.

For example, consider the following passage as being extracted from media content 270:

John is playing soccer with Jane and is the forward attacker. He kicked the ball to Jane at a 30 degree angle to the goal post while standing on the penalty box. How far from the left goal post should Jane be standing, such that she can intercept the ball.

Furthering this example, consider that the provider device 260 indicates that the entity "soccer" should be replaced with the entity "cricket". An entity graph 275 can then be generated from the term soccer that includes the following relationships:

soccer <position> forward attacker
soccer <action> kick
soccer <location> goal post
soccer <location> penalty box When replacing the term soccer, the replacement determiner 250 must also replace the entities with which the entity "soccer" forms a relationship, in order to avoid semantic irregularities in the processed passage. Thus, the replacement determiner 250 can query the entity relationship database with a query to select a position where the sport is "cricket," a query to select an action where the sport is "cricket," a query to select a location where the sport is "cricket," and a location where the sport is "cricket." To do so, the replacement determiner 250 can search through the entity relationship data structures 280 for nodes that correspond to the term "cricket," and identify edges that have similar values to the edges defined in the entity graph 275 for "cricket" generated using the above passage. In doing so, the replacement determiner 250 can identify the following additional replacement entities, which correspond to the queries, in order: the term "batsman," the term "hit," the term "stumps," and the term "crease."

In some implementations, the replacement determiner 250 can perform a graph query over the one or more entity relationship data structures 280 using the entity graph 275 generated for the entity to be replaced (in the example above, the term "soccer") and the replacement entity (in the example above, the term "cricket"). For example, in implementations where the entity relationship data structures 280 are stored as one or more graph data structures in a graph database, the replacement determiner 250 can perform one or more graph queries over the entity relationship data structures 280. In some implementations, the graph queries can specify further processing on the nodes returned by the graph queries. For example, a graph query may return more than one candidate replacement (e.g., in the above example, two "location" queries were performed). In performing the graph query, the replacement determiner can identify the edges in the entity relationship data structures 280 that are connected to the node "cricket". However, if there are many edges with the same value, many candidate nodes can be returned. To determine the most relevant from the candidate nodes, the replacement determiner 250 can determine a semantic relatedness value for each entity of the candidate nodes and the node being replaced. Furthering the example above, if the entity "goal post" is being replaced as part of the "soccer" entity replacement, the entities "stumps" and "crease" are both returned for a query for "location" where the sport is "cricket." The replacement determiner can then compute a semantic similarity between "stumps" and "goal post," and a semantic similarity between "crease" and "goal post". The candidate entities (e.g., "stumps" and "crease") can be ranked based on semantic similarity to the entity being replaced (here, "goal post"), and the entity associated with the highest level of semantic similarity can be selected for the replacement (here, "stumps").

To compute the semantic similarity, the replacement determiner can use a transformer model to generate embeddings for each of the candidate replacement entities and for the entity being replaced. Embeddings are a numerical representation of the semantic meaning of the words to which the embeddings correspond. To generate an embedding, the replacement determiner 250 can input the text corresponding to the entities in question into the transformer model. The transformer model can be a natural language processing model that can take sequences of text information as input, such as the text information of one or more passages in an information resource, text information from a closed-captioning feed in a video, or other text information. The text information can be broken up, for example, by one or more words for processing by the transformer model. The transformer model can be a pure attention-only sequence-to-sequence architecture model. The transformer model can be trained to classify content based on subject, topic, or category, to optimize semantic understanding of textual content for an educational environment.

The transformer can be, for example, a Bidirectional Encoder Representations from Transformer (BERT) model, which can include an input layer and many hidden layers. The transformer model can include one or more encoders, and can accept one or more words as input (e.g., a sentence, etc.) and generate real-valued vector representation for the sequence that maintains the semantic importance of each word (e.g., a token, etc.) in the sentence in vector form. These vector representations are the embeddings that numerically represent the semantic meaning of the input text. Put simply, an embedding is a numerical model of the input sentence of text. An embedding generated by the transformer model can model the semantic importance of a word in a sentence in a numeric format. Because the embeddings are numerical in format, mathematical operations can be performed on the embeddings. The replacement determiner 250 can generate the embeddings by inputting the text corresponding to each entity for which an embedding is desired to the transformer model, and extracting one or more vectors from the hidden layers in the transformer model. The semantic relevance value for each candidate replacement entity to the entity being replaced can be computed as the distance between the vector representations (e.g., the embeddings) of the candidate replacement entities to the embedding of the entity being replaced. The candidate entity that is closest to the entity being replaced in the embeddings space is also the entity that is most semantically relevant to the entity being replaced. Thus, the replacement determiner can choose the closest candidate entity in the embedding space as the replacement entity. This process can be repeated for each entity in the entity graph 275 that is connected to the root node (e.g., the entity that is specified by the provider device 260 for replacement with the specified replacement entity, etc.). An example depiction of multiple entity replacement is shown in FIG. 3.

Figure 3:
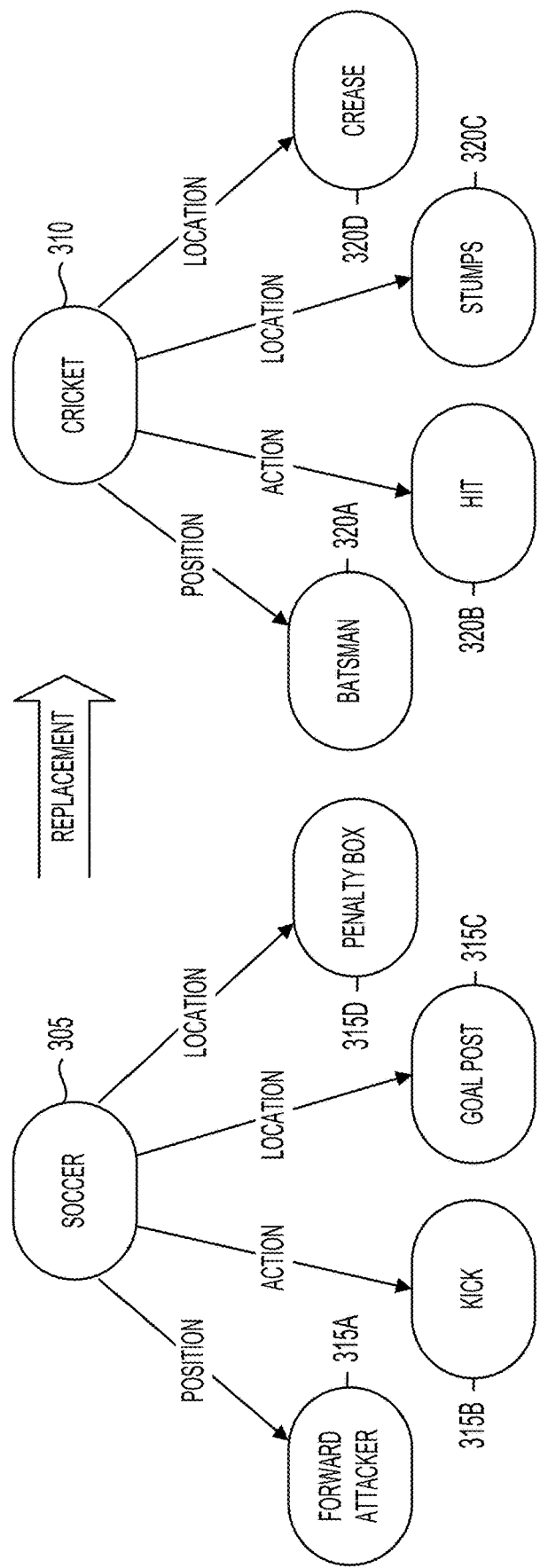
FIG. 3 illustrates an example diagram of a graph data structure showing a relationship between an entity and other entities used in a replacement operation, in accordance with one or more implementations.

Referring now to FIG. 3, depicted is an example diagram 300 of a graph data structure showing a relationship between an entity and other entities used in a replacement operation, in accordance with one or more implementations. The diagram 300 shows a graphical representation of the "soccer" to "cricket" replacement described above. As shown, the root node 305 is associated with the term "soccer," which is chosen for replacement with the term "cricket," which then becomes the replacement node 310. The semantically related nodes 315A-315D corresponding to terms related to "soccer" (the terms being "forward attacker," "kick," "goal post", and "penalty box," respectively) are then replaced with nodes semantically related to the respective terms that form an identical relationship with the entity "cricket". Thus, as shown, the entity graph 275 for the root node 305 is replaced with the replacement node 310 corresponding to "cricket," and replacement child nodes 320A-320D are chosen as replacement using the processes described herein above. The processed entity graph 275 can then be used to generate the processed content 285, as described in further detail herein below.

Referring back now to FIG. 2, and as described herein above, in some implementations, textual content can be generated from non-text content (e.g., video, audio, images, etc.) present in the media content 270 being modified. In some implementations, if the entity being replaced corresponds to text that is extracted from a non-text source, the replacement determiner 250 can identify replacement content having a similar format (e.g., a video replaces a video, an image replaces an image, etc.) that corresponds to the text entity chosen as the replacement. To do so, the replacement determiner 250 can perform one or more queries to the content sources 265 to retrieve non-text content of a similar format that is related to the replacement entity chosen for the non-text content. For example, if the text content extracted from a video relating to soccer is "soccer," and the replacement term "cricket" was chosen as the replacement entity for the term "soccer," the replacement determiner 250 can retrieve a video relating to the term "cricket" as replacement non-text content. Thus, in addition to determining replacements for text content, the replacement determiner can further determine Once each node in the entity graph 275 corresponding to the entities specified for replacement have been updated as described herein above, the processed content generator 255 can use the processed entity graph 275 (e.g., having the replaced nodes, etc.) to generate the processed content 285. An item of processed content 285 can correspond to the media content 270 used to generate the processed entity graph 275. To generate the processed content 285, the processed content generator 255 can copy all of the text, media (e.g., videos, images, audio, etc.), and any formatting information. Said another way, initially, the processed content 285 can be a duplicate of the respective media content 270 being processed. Next, the processed content generator 255 can use the identifications of the entities in the media content generated by the entity identifier 235 to identify each entity in the processed content 285 that should be replaced. Finally, the processed content generator 255 can access each entity in the processed content 285, identify the respective replacement entity from the processed entity graph 275, and replace the portion text content corresponding to the entity in the processed content 285 with the text content corresponding to the entity in the processed entity graph 275. This process can be repeated until each entity flagged for replacement has been replaced. Similarly, if non-text content is flagged for replacement, the processed content generator 255 can remove the content to be replaced and insert the replacement content (or an identifier of the replacement content retrieved from the content sources 265.

Once the processed content 285 has been generated, it can be stored in one or more data structures in the database 215. Then, the processed content generator 255 can transmit the processed content 285 to the provider device 260 for approval or modification. In doing so, the processed content generator 255 can present the processed content 285 on a display of the provider device 260. The processed content 285 can be transmitted to the provider device 260 with instructions that enable a user of the provider device 260 to edit the processed content 285 to correct any inconsistencies, if present. Any modifications made to the processed content can be transmitted by the provider device 260 to the processed content generator 255. The processed content generator 255 can store the modified processed content 285 in the database 215, including the modifications by the provider device 260. The processed content 285 can then be accessed by one or more of the client devices 220, for example, in response to a request for an item of the processed content 285.

Figure 4:
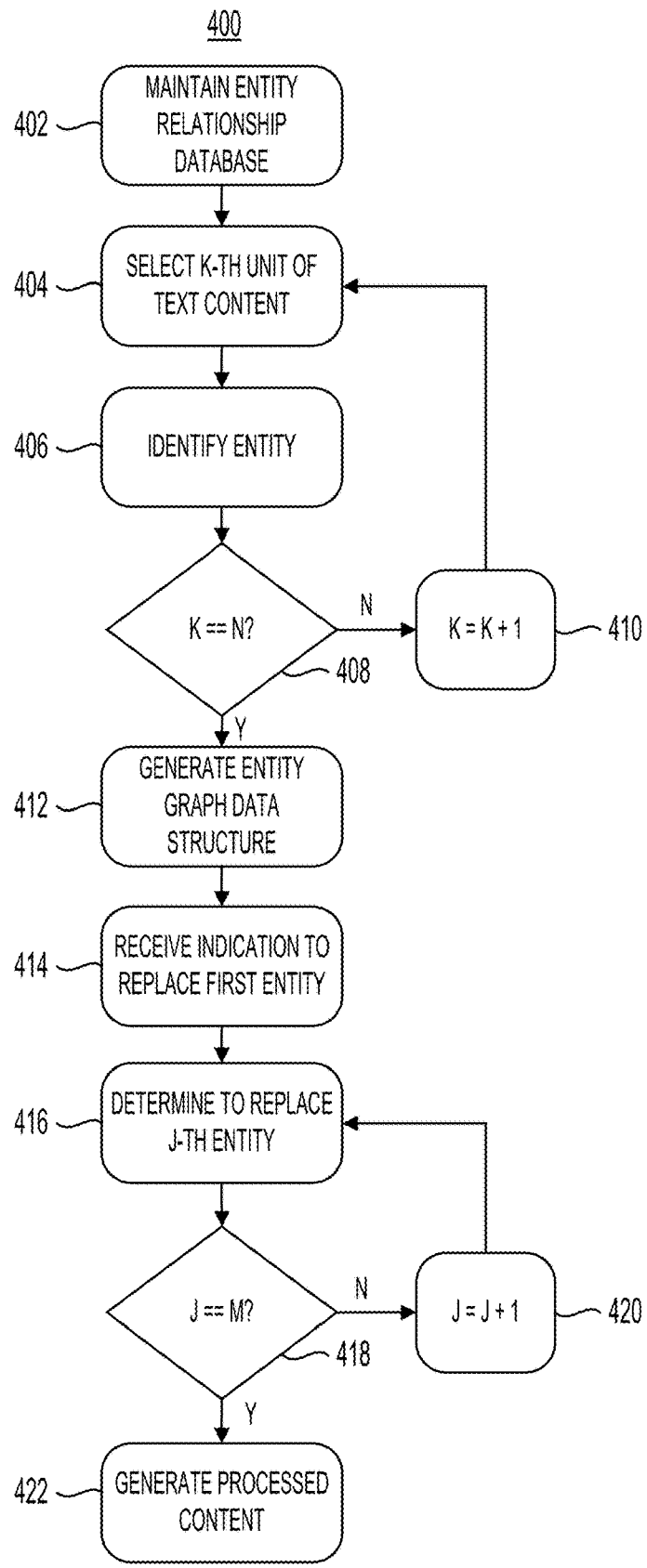
FIG. 4 illustrates an example flow diagram of a method of modifying teaching content based on localized cultural and contextual factors, in accordance with one or more implementations.

Referring now to FIG. 4, depicted is an illustrative flow diagram of a method 400 for generating and formatting teaching media in multiple formats for different contexts. The method 400 can be executed, performed, or otherwise carried out by the educational content system 205, the computer system 100 described herein in conjunction with FIGS. 1A-1D, or any other computing devices described herein. In brief overview of the method 400, the educational content system (e.g., the educational content system 205, etc.) can maintain an entity relationship database (STEP 402), select the k-th unit of text content in an item of media content (STEP 404), identify an entity corresponding to the text content (STEP 406), determine whether the counter register k is equal to the number of items of text content n (STEP 408), increment the counter register k (STEP 410), generate an entity graph data structure (STEP 412), receive an indication to replace a first entity (STEP 414), determine to replace j-th entity in the entity graph data structure (STEP 416), determine whether the j-th entity is equal to the number of entities in the entity graph data structure (STEP 418), increment the counter register j (STEP 420), and generate processed content (STEP 422).

In further detail of method 400, the educational content system (e.g., the educational content system 205, etc.) can maintain an entity relationship database (e.g., the entity relationship data structures 280, etc.) (STEP 402). The entity relationship data structures can include one or more semantic triples, which can form one or more graph data structures. As described herein above, the entity relationship data structures can be created from the semantic relationships between entities extracted from large amounts of text content, such as the text content maintained by one or more content sources (e.g., the one or more content sources 265, etc.). In some implementations, the educational content system can retrieve text information from the content sources. For example, the educational content system can transmit one or more requests for content to the content source. The requests for content can be scraping requests, or requests for some (e.g., a predetermined or specified number, etc.) or all content under a particular subdomain, related to a particular category, related to a particular topic, or related to a particular keyword. In response, the content source can transmit the content requested by the educational content system, for example, in one or more response messages. In some implementations, the requests for content transmitted to the content source can be batch content requests, and the content source response messages can transmit batch response messages including many portions or items of content (e.g., one or more information resources such as web pages, text articles, etc.). The educational content system can transmit such content requests to one or more content sources via the network, and thus retrieve content from a variety of content sources. For example, in some implementations, each content source can correspond to content of a particular language. In such implementations, the educational content system can retrieve content from the content sources corresponding to each language, and proceed with further processing as described herein.

In some implementations, for content that may not include text content (e.g., images, video, etc.), the educational content system can assign text content to the content. For example, the educational content system can perform object recognition and classification on an image to identify, classify, and label image content. The image can be labeled with one or more categories, objects, subjects, or other information that can be classified from the image. Likewise, similar processes can be performed on video content (e.g., image or object classification, text extraction from closed-captioning information, etc.) and from audio content (e.g., speech-to-text recognition to generate text corresponding to the audio, etc.). This information can be stored in association with the non-text content received from the content sources.

Using the content retrieved from the one or more content sources, the educational content system can generate semantic triples using a semantic processing model. For example, the educational content system can provide text content, or text content inferred or determined from other content formats, into the semantic processing model. The semantic processing model can be, for example, a named entity recognition (sometimes referred to as a named entity identification model or an entity extraction model) that can extract one or more named entities from the text content retrieved from the content sources. The named entity recognition model can identify and classify named entities in the text content retrieved from the content sources into predefined categories such as person names, organizations, actions, objects, locations, or time periods, among others. Thus, the semantic processing model can take the text content as input, and output a set of annotations for the text content that identify predicate subject object relationships. The semantic processing model can operate, for example, using machine learning (e.g., natural language processing techniques, etc.) or using tuned or trained rule-based techniques. For example, the semantic processing model can include a natural language processing model that can receive a sentence, or phrase, as input, and output annotations corresponding to the relationships between the entities in the sentence or phrase. In some implementations, a look-up table can be used to extract some well-known proper nouns as entities (e.g., well known locations, famous people, culturally relevant names, etc.).

The educational content system can use the relationships output from the semantic processing model to generate and store the entity relationship data structures in the database. For example, for each predicate subject object semantic triple, the educational content system can create a node corresponding to the subject of the semantic triple and create a node corresponding to the object of the semantic triple. The edge connecting the two nodes can be generated in the entity relationship data structures using the predicate. As described above, this relationship can be stored in a graph format as part of the entity relationship data structures. If the node corresponding to the subject already exists in the graph, but the edge or the node corresponding to the object do not, the educational content system can create the missing edge or node, and thus build up the graph in the entity relationship data structures. The educational content system can repeat this process, and construct a robust graph with many nodes and edges indicating many relationships, for all of the text content retrieved from the content sources. If a particular portion of text content used to generate a node was extracted from or is associated with (e.g., an indication of association received from the content sources, etc.) an image, video, or other non-text content, the node can be generated with an association to an identifier of the image (e.g., a uniform resource identifier, an identifier of media content (e.g., the media content 270, etc.) including the non-text content, etc.). In some implementations, the educational content system can receive indications of new or updated content from a content source, which causes the educational content system to transmit a request for the new or updated content to the respective content source. The educational content system can receive the new or updated content, and update the entity relationship data structures as described herein.

The entity identifier can extract the text content from a specified item of media content. In some implementations, the entity identifier can construct a single text string from all of the text content in a particular item of media content (or an information resource, etc.). In some implementations, the entity identifier can receive a selection of the information resource or the item of media content, from a provider device (e.g., the provider device 260, etc.). As described above, the provider device can make a selection of one or more items of media content using a user interface displayed at the provider device. The provider device can make the selection, for example, in a request to replace a particular entity in the item of media content, or if an entity graph has not yet been created for the item of media content, in a request to enumerate the entities in the media content that can be replaced.

The educational content system can select the k-th unit of text content from the specified item of media content (STEP 404). To identify entities for each portion of text content in the item of media content, the education content system can iteratively loop through each portion of text content based on a counter register k. Each portion of text content can be stored and indexed in a data structure by an index value (e.g., index 0, index 1, index 2, etc.). To identify entities for each portion of text content in the item of media content, the educational content system can select the portion of textual content (e.g., a word, sentence, paragraph, etc.) stored in association with an index value equal to the counter register k. If it is the first iteration of the loop, the counter register k may be initialized to an initialization value (e.g. k=0) before selecting the k-th item of text content. Accessing the portion of text content can include copying the data associated with the selected portion of text content to a different region of computer memory, for example a working region of memory in the educational content system.

The educational content system can identify an entity corresponding to the text content (STEP 406). To do so, the education content system can input the selected portion of text content to the entity extraction model, which can output one or more entities or entity relationships (e.g., entity annotations, etc.). In effect, the educational content system can identify each of the entities in an item of media content that can be replaced. In some implementations, the educational content system can generate an initial entity graph for each identified entity by generating the initial entity graph to include the identified entity as a root node. In some implementations, the educational content system can transmit the identified entities extracted from the text content. For example, the educational content system can transmit the media content with annotations for each of the identified entities in a response message. The response message can include instructions that cause the provider device to transmit a request to replace a selected entity in the media content in response to a selection (e.g., an interaction, etc.) with an identified entity in the media content. In some implementations, if an output from the entity extraction model is ambiguous, the educational content system can execute a disambiguation model on the ambiguous entity to identify similar entities (e.g., using semantic processing, etc.) that are stored in the entity relationship data structures. From the similar entities, the educational content system can identify a specific entity label for the ambiguous text content in the media content, and use the specific entity label in further processing.

The educational content system can determine whether the counter register k is equal to the number of items of text content n (STEP 408). To determine whether all of the entities have been identified in the item(s) of media content, the educational content system can compare the counter register k used to track the number of processed portions of text content to the number of portions of text content n. If the counter register k is not equal to (e.g., less than) the total number of portions of text content n, the educational content system can execute (STEP 410). If the counter register k is equal to (e.g., equal to or greater than) the total number of portions of text content n, the educational content system can execute (STEP 412).

The educational content system can increment the counter register k (STEP 410). To track the total number of portions of text content from which entities have been identified, the educational content system can add one to the counter register k to indicate the number of portions of text content that have been used by the educational content system to identify entities. After incrementing the value of the counter register k, the educational content system can execute (STEP 404).

The educational content system can generate an entity graph data structure (STEP 412). For example, in some implementations, the educational content system can receive an indication to replace a particular entity in the text content from a provider device. In some implementations, the educational content system can generate an entity graph (e.g., the entity graph 275, etc.) for each entity identified in the text content. To do so, the educational content system can utilize the output from the entity extraction model to identify entities that form close relationships. For example, as described herein above, the entity extraction model can annotate text content with an identification of predicate subject object triples. From these triples, the entity graph can generate a graph data structure for each identified entity, with each identified entity forming a root node of the graph data structure. The edges in the graph data structure can indicate a relationship between the root node entity and all of the other entities identified in the text content. If a relationship cannot be inferred between the root node entity and another entity from the text content (e.g., not enough information, etc.), the educational content system can access the entity relationship data structures to determine a type of relationship. For example, the educational content system can search the entity relationship data structures to identify an edge that connects a node corresponding to the root node entity and a second node corresponding to the second node with which a relationship could not be identified. The educational content system can extract the edge connecting the corresponding nodes in the entity relationship data structures, and use the edge to define the relationship between the nodes with the unknown relationship in the entity graph. Thus, the educational content system can utilize the entity relationship data structures to generate one or more entity graphs for each of the identified entities in the text content of the media content. The educational content system can store the entity graphs in association with the corresponding item of media content. In some implementations, the educational content system can store an entity graph in association with the respective portions of the text information that correspond to the root node of the entity graph.

The educational content system can receive an indication to replace a first entity (STEP 414). For example, as described above, an item of media content can be displayed on the provider device with the one or more identified entities from the text of the media content in one or more user interfaces. In the user interface, the provider device can select an entity in the displayed media content for replacement. In some implementations, the provider device can transmit a request for a list of candidate replacement entities to the educational content system. In some implementations, the provider device can transmit a request for a target location to the educational content system as part of the request for the list of candidate replacement entities. In some implementations, the provider device can transmit a request for a target language to the educational content system as part of the request for the list of candidate replacement entities. In such implementations, the educational content system can use a lookup table to determine a target location based on the indication of the target language.

In some implementations, the provider device can transmit an indication of a user profile in the request for the list of candidate replacement entities. The educational content system can receive the indication of the user profile. The profiles can correspond to one or more students or users that access the media content and processed content (e.g., the processed content 285, etc.) via the educational content system. Each of the profiles can be associated with a profile identifier that identifies the profile. In general, the profiles can be accessed via one or more of the client devices or the provider device using particular authentication credentials. For example, each profile can be accessed using a particular set of authentication credentials. A profile can include information about a user, and can be accessed and modified via one or more of the client devices or the provider device. In some implementations, a profile can be stored in association with a list of courses or lesson plans that can be defined by an educator using a provider device or a client device. The profile can include one or more profile attributes, which can indicate user interests, preferences, location, or other information.

Using these profile attributes and the indication of the entity to be replaced, the educational content system can access the entity relationship data structures to generate the candidate entities. For example, given a particular entity that corresponds to a particular category (e.g., sports, cars, etc.), the educational content system can identify one or more profile attributes that correspond to that category. For example, the profile attributes can indicate that a user is interested in baseball. Using this information, the educational content system can access the entity relationship data structures to identify candidate replacement entities that are related to the category (e.g., sports, cars, etc.) and to one or more of the interests indicated in the profile attributes. Likewise, if the entity to be replaced is a name or a location, the educational content system can access the entity relationship data structures to identify one or more candidate replacement entities that relate to locations proximate to the location indicated in the user profile, or names common to the location indicated in the user profile attributes.

Thus, the educational content system can query the entity relationship data structures 280 to identify one or more candidate replacement entities. For example, the candidate replacement entities can include entities that are semantically related to the selected entity. In some implementations, the educational content system can identify one or more synonyms of the selected entity (e.g., or a similar phrase with a similar meaning, etc.). In some implementations, if the selected entity is a name (e.g., a name of a person, a name of a location, etc.), the educational content system can identify one or more candidate replacement entities for the selected entity that correspond to a target location. The educational content system can transmit a response message including the candidate list of replacement entities to the provider device for display (e.g., in the user interface as one or more actionable objects, etc.). A user of the provider device can make a selection from the list of candidate replacement entities, causing the provider device to transmit a message to the educational content system specifying the replacement entity and the entity in the item of media content that is subject to the replacement request.

The educational content system can determine to replace j-th entity in the entity graph data structure (STEP 416). For example, the candidate replacement entities can include entities that are semantically related to the selected entity. In some implementations, the educational content system can identify one or more synonyms of the selected entity (e.g., or a similar phrase with a similar meaning, etc.). In some implementations, if the selected entity is a name (e.g., a name of a person, a name of a location, etc.), the educational content system can identify one or more candidate replacement entities for the selected entity that correspond to a target location. The educational content system can transmit a response message including the candidate list of replacement entities to the provider device for display (e.g., in the user interface as one or more actionable objects, etc.). A user of the provider device can make a selection from the list of candidate replacement entities, causing the provider device to transmit a message to the educational content system specifying the replacement entity and the entity in the item of media content that is subject to the replacement request.

In addition to replacing the specified entity in the media content, the educational content system can replace other entities in the media content that are semantically related to the replacement entity. To do so, the educational content system can determine to replace a second entity corresponding to a second node in the entity graph that is connected to the root node (e.g., the first entity being replaced) in the entity graph. The educational content system can replace one or more of the other entities (e.g., entities corresponding to nodes in the entity graph that are connected to the root node, etc.) by querying the entity relationship data structures.

For example, consider the following passage as being extracted from media content:

John is playing soccer with Jane and is the forward attacker. He kicked the ball to Jane at a 30 degree angle to the goal post while standing on the penalty box. How far from the left goal post should Jane be standing, such that she can intercept the ball.

Furthering this example, consider that the provider device indicates that the entity "soccer" should be replaced with the entity "cricket". An entity graph can then be generated from the term soccer that includes the following relationships:

soccer <position> forward attacker
soccer <action> kick
soccer <location> goal post
soccer <location> penalty box When replacing the term soccer, the educational content system must also replace the entities with which the entity "soccer" forms a relationship, in order to avoid semantic irregularities in the processed passage. Thus, the educational content system can query the entity relationship database with a query to select a position where the sport is "cricket," a query to select an action where the sport is "cricket," a query to select a location where the sport is "cricket," and a location where the sport is "cricket." To do so, the educational content system can search through the entity relationship data structures for nodes that correspond to the term "cricket," and identify edges that have similar values to the edges defined in the entity graph for "cricket" generated using the above passage. In doing so, the educational content system can identify the following additional replacement entities, which correspond to the queries, in order: the term "batsman," the term "hit," the term "stumps," and the term "crease."

In some implementations, the educational content system can perform a graph query over the one or more entity relationship data structures using the entity graph generated for the entity to be replaced (in the example above, the term "soccer") and the replacement entity (in the example above, the term "cricket"). For example, in implementations where the entity relationship data structures are stored as one or more graph data structures in a graph database, the educational content system can perform one or more graph queries over the entity relationship data structures. In some implementations, the graph queries can specify further processing on the nodes returned by the graph queries. For example, a graph query may return more than one candidate replacement (e.g., in the above example, two "location" queries were performed). In performing the graph query, the educational content system can identify the edges in the entity relationship data structures that are connected to the node "cricket". However, if there are many edges with the same value, many candidate nodes can be returned. To determine the most relevant from the candidate nodes, the educational content system can determine a semantic relatedness value for each entity of the candidate nodes and the node being replaced. Furthering the example above, if the entity "goal post" is being replaced as part of the "soccer" entity replacement, the entities "stumps" and "crease" are both returned for a query for "location" where the sport is "cricket." The educational content system can then compute a semantic similarity between "stumps" and "goal post," and a semantic similarity between "crease" and "goal post". The candidate entities (e.g., "stumps" and "crease") can be ranked based on semantic similarity to the entity being replaced (here, "goal post"), and the entity associated with the highest level of semantic similarity can be selected for the replacement (here, "stumps").

To compute the semantic similarity, the educational content system can use a transformer model to generate embeddings for each of the candidate replacement entities and for the entity being replaced. Embeddings are a numerical representation of the semantic meaning of the words to which the embeddings correspond. To generate an embedding, the educational content system can input the text corresponding to the entities in question into the transformer model. The transformer model can be a natural language processing model that can take sequences of text information as input, such as the text information of one or more passages in an information resource, text information from a closed-captioning feed in a video, or other text information. The text information can be broken up, for example, by one or more words for processing by the transformer model. The transformer model can be a pure attention-only sequence-to-sequence architecture model. The transformer model can be trained to classify content based on subject, topic, or category, to optimize semantic understanding of textual content for an educational environment.

The transformer can be, for example, a Bidirectional Encoder Representations from Transformer (BERT) model, which can include an input layer and many hidden layers. The transformer model can include one or more encoders, and can accept one or more words as input (e.g., a sentence, etc.) and generate real-valued vector representation for the sequence that maintains the semantic importance of each word (e.g., a token, etc.) in the sentence in vector form. These vector representations are the embeddings that numerically represent the semantic meaning of the input text. Put simply, an embedding is a numerical model of the input sentence of text. An embedding generated by the transformer model can model the semantic importance of a word in a sentence in a numeric format. Because the embeddings are numerical in format, mathematical operations can be performed on the embeddings. The educational content system can generate the embeddings by inputting the text corresponding to each entity for which an embedding is desired to the transformer model, and extracting one or more vectors from the hidden layers in the transformer model. The semantic relevance value for each candidate replacement entity to the entity being replaced can be computed as the distance between the vector representations (e.g., the embeddings) of the candidate replacement entities to the embedding of the entity being replaced. The candidate entity that is closest to the entity being replaced in the embeddings space is also the entity that is most semantically relevant to the entity being replaced. Thus, the educational content system can choose the closest candidate entity in the embedding space as the replacement entity. This process can be repeated for each entity in the entity graph that is connected to the root node (e.g., the entity that is specified by the provider device 260 for replacement with the specified replacement entity, etc.).

The educational content system can determine whether the j-th entity is equal to the number of entities in the entity graph data structure (STEP 418). To determine whether all of the entities have been replaced in the entity graph data structure, the educational content system can compare the counter register k used to track the number of entities to the number of entities in the entity graph data structure n. If the counter register k is not equal to (e.g., less than) the total number of entities in the entity graph data structure n, the educational content system can execute (STEP 420). If the counter register k is equal to (e.g., equal to or greater than) the total number of entities in the entity graph data structure n, the educational content system can execute (STEP 422).

The educational content system can increment the counter register j (STEP 420). To track the total number of entities that have been replaced, the educational content system can add one to the counter register k to indicate the number of entities in the entity graph data structure that have been replaced. After incrementing the value of the counter register k, the educational content system can execute (STEP 416).

The educational content system can generate processed content (STEP 422). The educational content system can use the processed entity graph (e.g., having the replaced nodes, etc.) to generate the processed content. An item of processed content can correspond to the media content used to generate the processed entity graph. To generate the processed content, the educational content system can copy all of the text, media (e.g., videos, images, audio, etc.), and any formatting information. Said another way, initially, the processed content can be a duplicate of the respective media content being processed. Next, the educational content system can use the identifications of the entities in the media content generated by the educational content system to identify each entity in the processed content that should be replaced. Finally, the educational content system can access each entity in the processed content, identify the respective replacement entity from the processed entity graph, and replace the portion text content corresponding to the entity in the processed content with the text content corresponding to the entity in the processed entity graph. This process can be repeated until each entity flagged for replacement has been replaced. Similarly, if non-text content is flagged for replacement, the educational content system can remove the content to be replaced and insert the replacement content (or an identifier of the replacement retrieved from the content sources.

Once the processed content has been generated, it can be stored in one or more data structures in the database. Then, the educational content system can transmit the processed content to the provider device for approval or modification. In doing so, the educational content system can present the processed content on a display of the provider device. The processed content can be transmitted to the provider device with instructions that enable a user of the provider device to edit the processed content to correct any inconsistencies, if present. Any modifications made to the processed content can be transmitted by the provider device to the educational content system. The educational content system can store the modified processed content in the database, including the modifications by the provider device. The processed content can then be accessed by one or more of the client devices, for example, in response to a request for an item of the processed content.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the educational content system 205 can include clients and servers. For example, the educational content system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the educational content system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for modifying teaching content based on localized cultural and contextual factors, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method of modifying teaching content based on localized cultural and contextual factors, comprising:
   maintaining, by one or more processors coupled to memory, an entity relationship database comprising a plurality of semantic triples;
   identifying, by the one or more processors, using an entity extraction model, a plurality of entities based on text content of an information resource;
   generating, by the one or more processors, based on the plurality of semantic triples in the entity relationship database, an entity graph data structure comprising a plurality of nodes, each node of the plurality of nodes corresponding to a respective entity of the plurality of entities identified in the text content;
   receiving, by the one or more processors, from a provider device, an indication to replace a first entity corresponding to a first node of the plurality of nodes with a first replacement entity;
   determining, by the one or more processors, to replace a second entity corresponding to a second node in the plurality of nodes with a second replacement entity based on the plurality of semantic triples in the entity relationship database and a connection between the first node and the second node in the entity graph data structure; and
   generating, by the one or more processors, processed text content based on the text content of the information resource, the first replacement entity and the second replacement entity.

2. The method of claim 1, wherein identifying the plurality of entities based on the text content in the information resource further comprises receiving, by the one or more processors from the provider device, a selection of the information resource; and
   wherein generating the processed text content further comprises presenting, by the one or more processors on a display of the provider device, the information resource having the text content replaced with the processed text content.

3. The method of claim 1, wherein maintaining the entity relationship database further comprises retrieving, by the one or more processors, text information from a content source; and
   generating, by the one or more processors, the plurality of semantic triples using the entity extraction model and the text information from the content source.

4. The method of claim 1, wherein receiving the indication to replace the first entity with the first replacement entity further comprises:

transmitting, by the one or more processors to the provider device, one or more candidate entities to replace the first entity; and receiving, by the one or more processors from the provider device, the first entity as a selection of a candidate entity of the one or more candidate entities.

5. The method of claim 4, further comprising:
receiving, by the one or more processors, an indication of a target location for replacement of the first entity; and
generating, by the one or more processors, the one or more candidate entities based on the target location and the plurality of semantic triples.

6. The method of claim 5, wherein receiving the indication of the target location further comprises:
receiving, by the one or more processors, an indication of a target language; and
determining, by the one or more processors, the target location based on the indication of the target language.

7. The method of claim 4, further comprising:
receiving, by the one or more processors, an indication of a user profile comprising one or more profile attributes; and
generating, by the one or more processors, the one or more candidate entities based on the one or more profile attributes and the plurality of semantic triples.

8. The method of claim 1, wherein the plurality of semantic triples are stored in the entity relationship database as one or more graph data structures; and
wherein determining to replace the second entity further comprises performing, by the one or more processors, a graph query over the one or more graph data structures based on the first entity corresponding to the first node.

9. The method of claim 8, wherein performing the graph query over the one or more graph data structures comprises matching a first edge associated with the first node in the entity graph data structure with a second edge in the one or more graph data structures associated with the first replacement entity.

10. The method of claim 1, further comprising replacing, by the one or more processors, a first video of the information resource with a replacement video of the information resource based on the indication to replace the first entity and the plurality of semantic triples.

11. A system for modifying teaching content based on localized cultural and contextual factors, comprising:
one or more processors coupled to memory, the one or more processors configured to:
maintain an entity relationship database comprising a plurality of semantic triples;
identify, using an entity extraction model, a plurality of entities based on text content of an information resource;
generate, based on the plurality of semantic triples in the entity relationship database, an entity graph data structure comprising a plurality of nodes, each node of the plurality of nodes corresponding to a respective entity of the plurality of entities identified in the text content;
receive, from a provider device, an indication to replace a first entity corresponding to a first node of the plurality of nodes with a first replacement entity;
determine to replace a second entity corresponding to a second node in the plurality of nodes with a second replacement entity based on the plurality of semantic triples in the entity relationship database and a connection between the first node and the second node in the entity graph data structure; and
generate processed text content based on the text content of the information resource, the first replacement entity and the second replacement entity.

12. The system of claim 11, wherein the one or more processors are further configured to identify the plurality of entities based on the text content in the information resource by receiving, from the provider device, a selection of the information resource; and
wherein the one or more processors are further configured to generate the processed text content by presenting, on a display of the provider device, the information resource having the text content replaced with the processed text content.

13. The system of claim 11, wherein the one or more processors are further configured to maintain the entity relationship database by:
retrieving text information from a content source; and
generating the plurality of semantic triples using the entity extraction model and the text information from the content source.

14. The system of claim 11, wherein the one or more processors are further configured to receive the indication to replace the first entity with the first replacement entity by:
transmitting, to the provider device, one or more candidate entities to replace the first entity; and
receiving, from the provider device, the first entity as a selection of a candidate entity of the one or more candidate entities.

15. The system of claim 14, wherein the one or more processors are further configured to:
receive an indication of a target location for replacement of the first entity; and
generate the one or more candidate entities based on the target location and the plurality of semantic triples.

16. The system of claim 15, wherein the one or more processors are further configured to receive the indication of the target location by:
receiving an indication of a target language; and
determining the target location based on the indication of the target language.

17. The system of claim 14, wherein the one or more processors are further configured to:
receive an indication of a user profile comprising one or more profile attributes; and
generate the one or more candidate entities based on the one or more profile attributes and the plurality of semantic triples.

18. The system of claim 11, wherein the plurality of semantic triples are stored in the entity relationship database as one or more graph data structures; and
wherein the one or more processors are further configured to determine to replace the second entity by performing a graph query over the one or more graph data structures based on the first entity corresponding to the first node.

19. The system of claim 18, wherein the one or more processors are further configured to perform the graph query over the one or more graph data structures by matching a first edge associated with the first node in the entity graph data structure with a second edge in the one or more graph data structures associated with the first replacement entity.

20. The system of claim 11, wherein the one or more processors are further configured to replace a first video of the information resource with a replacement video of the information resource based on the indication to replace the first entity and the plurality of semantic triples.

\* \* \* \* \*